United States Patent
Hassapis et al.

(10) Patent No.: US 8,432,448 B2
(45) Date of Patent: Apr. 30, 2013

(54) STEREO CAMERA INTRUSION DETECTION SYSTEM

(75) Inventors: Chris Hassapis, Hermosa Beach, CA (US); H. Keith Nishihara, Los Altos, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 1883 days.

(21) Appl. No.: 11/502,229

(22) Filed: Aug. 10, 2006

(65) Prior Publication Data

US 2008/0043106 A1 Feb. 21, 2008

(51) Int. Cl.
*H04N 7/18* (2006.01)

(52) U.S. Cl.
USPC ........... 348/153; 348/143; 348/152; 348/154; 348/155; 348/159; 382/103; 382/107; 702/152

(58) Field of Classification Search .................. 348/143, 348/152–155, 159, 169, 207.99, 286, 487; 348/135, 148, 149, 47; 382/103, 104, 107, 382/291; 342/104
See application file for complete search history.

(56) References Cited

U.S. PATENT DOCUMENTS

| | | | |
|---|---|---|---|
| 4,468,694 A | 8/1984 | Edgar | |
| 4,843,568 A | 6/1989 | Krueger et al. | |
| 4,924,506 A * | 5/1990 | Crossley et al. | 382/286 |
| 5,220,441 A * | 6/1993 | Gerstenberger | 358/487 |
| 5,239,373 A | 8/1993 | Tang et al. | |
| 5,475,422 A | 12/1995 | Mori et al. | |
| 5,483,261 A | 1/1996 | Yasutake | |
| 5,563,988 A | 10/1996 | Maes et al. | |
| 5,913,727 A | 6/1999 | Ahdoot | |
| 5,999,185 A | 12/1999 | Kato et al. | |
| 6,002,808 A | 12/1999 | Freeman | |
| 6,128,003 A | 10/2000 | Smith et al. | |
| 6,147,678 A | 11/2000 | Kumar et al. | |
| 6,195,104 B1 | 2/2001 | Lyons | |
| 6,204,852 B1 | 3/2001 | Kumar et al. | |

(Continued)

FOREIGN PATENT DOCUMENTS

| | | |
|---|---|---|
| DE | 197 39 285 C1 | 11/1998 |
| EP | 0 571 702 A2 | 12/1993 |

(Continued)

OTHER PUBLICATIONS

Search Report for corresponding GB 0715481.8, Date of Search: Nov. 27, 2007.

(Continued)

*Primary Examiner* — Sath V Perungavoor
*Assistant Examiner* — Nathnael Aynalem
(74) *Attorney, Agent, or Firm* — Tarolli, Sundheim, Covell & Tummino LLP

(57) ABSTRACT

A system and method is provided for an intrusion detection system. The intrusion detection system comprises a first camera configured to acquire first visual images of a monitored area and a second camera configured to acquire second visual images of the monitored area. The intrusion detection system also comprises a detection device configured to compare the first images with a background image of the monitored area. The detection device can mark differences between the first images and the background image as a potential intruder. The intrusion detection system further comprises a tracking device configured to evaluate each of the first images relative to each of the second images to determine three-dimensional characteristics associated with the potential intruder.

32 Claims, 8 Drawing Sheets

U.S. PATENT DOCUMENTS

| | | | |
|---|---|---|---|
| 6,222,465 B1 | 4/2001 | Kumar et al. | |
| 6,327,381 B1 | 12/2001 | Rogina et al. | |
| 6,353,428 B1 | 3/2002 | Maggioni et al. | |
| 6,359,612 B1 | 3/2002 | Peter et al. | |
| 6,434,255 B1 | 8/2002 | Harakawa | |
| 6,469,734 B1 * | 10/2002 | Nichani et al. | 348/152 |
| 6,512,507 B1 | 1/2003 | Furihata et al. | |
| 6,624,833 B1 | 9/2003 | Kumar et al. | |
| 6,681,031 B2 | 1/2004 | Cohen et al. | |
| 6,695,770 B1 | 2/2004 | Choy et al. | |
| 6,714,901 B1 | 3/2004 | Cotin et al. | |
| 6,720,949 B1 | 4/2004 | Pryor et al. | |
| 6,788,809 B1 | 9/2004 | Grzeszczuk et al. | |
| 6,796,656 B1 | 9/2004 | Dadourian | |
| 6,806,849 B2 | 10/2004 | Sullivan | |
| 6,857,746 B2 | 2/2005 | Dyner | |
| 6,950,534 B2 | 9/2005 | Cohen et al. | |
| 6,956,573 B1 | 10/2005 | Bergen et al. | |
| 6,983,065 B1 | 1/2006 | Akgul et al. | |
| 7,042,440 B2 | 5/2006 | Pryor et al. | |
| 7,129,927 B2 | 10/2006 | Mattsson | |
| 7,259,747 B2 | 8/2007 | Bell | |
| 7,701,439 B2 | 4/2010 | Hillis et al. | |
| 7,929,017 B2 | 4/2011 | Aggarwal et al. | |
| 2001/0006426 A1 | 7/2001 | Son et al. | |
| 2001/0043719 A1 | 11/2001 | Harakawa et al. | |
| 2002/0090146 A1 | 7/2002 | Heger et al. | |
| 2002/0093666 A1 | 7/2002 | Foote et al. | |
| 2002/0122113 A1 | 9/2002 | Foote | |
| 2002/0126161 A1 | 9/2002 | Kuzunuki et al. | |
| 2002/0186221 A1 | 12/2002 | Bell | |
| 2003/0058341 A1 | 3/2003 | Brodsky et al. | |
| 2003/0067537 A1 | 4/2003 | Myers | |
| 2003/0085866 A1 | 5/2003 | Bimber | |
| 2003/0156756 A1 | 8/2003 | Gokturk et al. | |
| 2003/0218761 A1 | 11/2003 | Tomasi et al. | |
| 2004/0041905 A1 * | 3/2004 | Shibayama | 348/47 |
| 2004/0046747 A1 | 3/2004 | Bustamante | |
| 2004/0108990 A1 | 6/2004 | Lieberman et al. | |
| 2004/0113885 A1 | 6/2004 | Genc et al. | |
| 2004/0125207 A1 * | 7/2004 | Mittal et al. | 348/169 |
| 2004/0183775 A1 | 9/2004 | Bell | |
| 2004/0193413 A1 | 9/2004 | Wilson et al. | |
| 2004/0239761 A1 * | 12/2004 | Jin et al. | 348/153 |
| 2005/0002074 A1 | 1/2005 | McPheters et al. | |
| 2005/0012817 A1 * | 1/2005 | Hampapur et al. | 348/143 |
| 2005/0052714 A1 | 3/2005 | Klug et al. | |
| 2005/0068537 A1 | 3/2005 | Han et al. | |
| 2005/0088714 A1 | 4/2005 | Kremen | |
| 2005/0110964 A1 | 5/2005 | Bell et al. | |
| 2005/0151850 A1 | 7/2005 | Ahn et al. | |
| 2005/0166163 A1 | 7/2005 | Chang et al. | |
| 2005/0237388 A1 * | 10/2005 | Tani | 348/143 |
| 2005/0275628 A1 | 12/2005 | Balakrishnan et al. | |
| 2005/0285945 A1 * | 12/2005 | Usui et al. | 348/207.99 |
| 2005/0286101 A1 | 12/2005 | Garner et al. | |
| 2006/0010400 A1 | 1/2006 | Dehlin et al. | |
| 2006/0036944 A1 | 2/2006 | Wilson | |
| 2006/0052953 A1 | 3/2006 | Vilanova et al. | |
| 2006/0092178 A1 | 5/2006 | Tanguay | |
| 2006/0125799 A1 | 6/2006 | Hillis et al. | |
| 2006/0187196 A1 | 8/2006 | Underkoffler et al. | |
| 2006/0203363 A1 | 9/2006 | Levy-Rosenthal | |
| 2006/0209021 A1 | 9/2006 | Yoo et al. | |
| 2007/0024590 A1 | 2/2007 | Krepec | |
| 2007/0064092 A1 | 3/2007 | Sandbeg et al. | |
| 2008/0013826 A1 | 1/2008 | Hillis et al. | |
| 2008/0150913 A1 | 6/2008 | Bell et al. | |
| 2008/0244468 A1 | 10/2008 | Nishihara et al. | |
| 2009/0015791 A1 | 1/2009 | Chang et al. | |
| 2009/0103780 A1 | 4/2009 | Nishahara et al. | |
| 2009/0115721 A1 | 5/2009 | Aull et al. | |

FOREIGN PATENT DOCUMENTS

| | | |
|---|---|---|
| EP | 0 571 702 A3 | 12/1993 |
| EP | 0 913 790 A1 | 5/1999 |
| EP | 1 223 537 A2 | 12/2001 |
| EP | 0 986 252 B1 | 3/2006 |
| EP | 1 689 172 A1 | 8/2006 |
| EP | 1 879 129 A1 | 1/2008 |
| EP | 1 879 130 A2 | 1/2008 |
| EP | 2 056 185 A2 | 5/2009 |
| EP | 2 068 230 A2 | 6/2009 |
| GB | 2460937 A | 12/2009 |
| JP | 62264390 A | 1/1987 |
| JP | 4271423 A | 2/1991 |
| JP | 04031996 A | 2/1992 |
| WO | WO 98/13746 | 4/1998 |
| WO | WO 00/02187 A1 | 1/2000 |
| WO | WO 00/21023 A1 | 4/2000 |
| WO | WO 00/55802 A | 9/2000 |
| WO | WO 03/026299 A1 | 3/2003 |
| WO | WO 03/088157 A1 | 10/2003 |
| WO | WO 2008/001202 A3 | 1/2008 |

OTHER PUBLICATIONS

Bretzner, et al.: "Hand Gesture Recognition Using Multi-Scale Colour Features, Hierarchical Models and Particle Filtering"; Automatic Face and Gesture Recognition, 2002, Proceedings. Fifth IEEE International Conference on, IEEE, Piscataway, NJ, USA, May 20, 2002, pp. 423-428, XP010949393, ISBN: 978-0-7695-1602-8, p. 2.
British Search Report for corresponding GB 0909597.7 completed Sep. 17, 2009.
British Search Report for corresponding GB0910067.8, completed Oct. 15, 2009.
DE Office Action for corresponding DE 10 2009 043 798.3, issued Nov. 10, 2010.
Dubois, et al.: "In Vivo Measurement of Surgical Gestures"; IEEE Transactions on Biochemical Engineering, vol. 49, No. 1, Jan. 2002, pp. 49-54.
EP Search Report for corresponding EP 07 25 2716, completed Jun. 4, 2010.
EP Search Report for corresponding EP 07 25 2870 completed Aug. 16, 2010 by Suphi Umut Naci of the Hague.
European Search Report for corresponding EP 07 25 2717 completed Sep. 27, 2007 by Martin Müller of the EPO.
Fiorentino, et al.: "Spacedesign: A Mixed Reality Workspace for Aesthetic Industrial Design"; Mixed and Augmented Reality, 2002. ISMAR 2002. Proceedings. International Symposium on Sep. 30-Oct. 1, 2002, Piscataway, NJ, USA, IEEE, Sep. 30, 2002, pp. 86-318, XP010620945, ISBN: 0-7695-1781-1; Abstract, Figs. 1, 2; p. 86, left-hand col., ¶4; p. 87, left-hand col., ¶4-right-hand col.
German Office Action for corresponding DE 10 2009 034 413.6-53, issued Sep. 29, 2010.
Hartley, et al.: "Multiple View Geometry in Computer Vision, Structure Computation"; Jul. 31, 2000, Multiple View Geometry in Computer Vision, Cambridge University Press, GB, pp. 295-311, XP002521742, ISBN: 9780521623049, pp. 295-311, figures 11.1, 11.2 & 11.7.
Ishibuci, et al.: "Real Time Hand Gesture Recognition Using 3D Prediction Model"; Proceedings of the International Conference on Systems, Man and Cybernetics. Le Touquet, Oct. 17-20, 1993; New York, IEEE, US LNKD-DOI: 10.1109/ICSMC.1993.390870, vol. -, Oct. 17, 1993, pp. 324-328, XP010132504, ISBN: 978-0-7803-0911-1, pp. 325; figures 1-4.
Kjeldsen, et al.: "Toward the Use of Gesture in Traditional User Interfaces"; Automatic Face and Gesture Recognition, 1996, Proceedings of the Second International Conference on Killington, VT, USA 14-16 19961014' Los Alamitos, CA, USA, IEEE Comput. Soc., ISBN 978-0-8186-7713-7; whole document.
Korida, K et al: "An Interactive 3D Interface for a Virtual Ceramic Art Work Environment"; Virtual Systems and Multimedia, 1997. VSMM '97. Proceedings., International Conference on Geneva, Switzerland Sep. 10-12, 1997, Los Alamitos, CA, USA, IEEE Comput. Soc, US, Sep. 10, 1997, pp. 227-234, XP010245649, ISBN: 0-8186-8150-0; Abstract, Figs. 1, 2, 5, 7-11.
Leibe, et al.: "Toward Spontaneous Interaction with the Perceptive Workbench"; IEEE Computer Graphics and Applications; p. 54-65XP-000969594; Nov./Dec. 2000.

Mitchell: "Virtual Mouse"; IP.COM Inc, West Henrietta, NY, US, May 1, 1992 ISSN 1533-0001; whole document.

Office Action for corresponding DE 10 2009 025 236.3, issued May 2010.

Pajares, et al.: "Usability Analysis of a Pointing Gesture Interface"; Systems, Man and Cybernetic, 2004 IEEE International Conference on , Oct. 10, 2004, ISBN 978-0-7803-8566-5; see e.g. sections 2.1 and 4.

Pavlovic, et al.: "Visual Interpretation of Hand Gestures for Human-Computer Interaction: A Review"; Jul. 1, 1997, IEEE Transactions on Pattern Analysis and Machine Intelligence, IEEE Service Center, Los Alamitos, CA, US LNKD-DOI: 10.1109/34.598226, pp. 677-695, XP000698168, ISSN: 0162-8828, pp. 14-16, figure 5.

Plesniak, W et al.: "Spatial Interaction with Haptic Holograms"; Multimedia Computing and Systems, 1999, IEEE International Conference on Florence, Italy Jun. 7-11, 1999, Los Alamitos, CA USA, IEEE Comput. Soc. US, vol. 1, Jun. 7, 1999, pp. 413-426, XP010342817 ISBN: 0-7695-0253-9; Abstract, Figs. 7, 8.

REHG: "visual Analysis of High DOF Articulated Objects with Application to Hand Tracking"; [online] 1995, XP002585209, School of Computer Science Carnegie Mellon University, Retrieved from the internet: URL: http//www.dtoc/,o;/cgi-bin/GetTRDoc?AD=ADA306677&Location=U2&doc=GetRDoc.pdf> [retrieved on May 25, 2010], p. 1, 28, 31.

Sato, Y et al.: "Real-Time Input of 3D Pose and Gestures of a User's Hand and Its Applications for HCI"; Proceedings IEEE 2001 virtual Reality. (VR). Yokohama, Japan, Mar. 13, 2001, pp. 79-86, XP010535487; ISBN: 0-7695-0948-7; Abstract, Figs. 3, 4, 6, 8.

Search Report for corresponding British application No. GB0917797.3; completed Jan. 28, 2010 by Mr. Jeremy Cowen.

Search Report for corresponding GB 0913330.7; Completed Nov. 3, 2009 by Dr. Russell Maurice.

Sonka, et al.: "Image Processing, Analysis, and Machine Vision Second Edition"; Sep. 30, 1998, Thomson, XP002585208, ISBN: 053495393X, p. v-xii, p. 82-89.

Sutcliffe, et al.: "Presence, Memory and Interaction in Virtual Environments"; International Journal of Human-Computer Studies, 62 (2005), pp. 307-327.

Vámossy, et al.: "Virtual Hand—Hand Gesture Recognition System"; SISY 2007, 5th International Symposium on Intelligent Systems and Informatics, Aug. 24-25, 2007, Subolica, Serbia, IEEE, p. 97-102.

Office Action for corresponding DE 10 2007 037 647.4 dated Oct. 9, 2012.

* cited by examiner

STEREO CAMERA INTRUSION DETECTION SYSTEM

TECHNICAL FIELD

The present invention relates generally to intrusion detection systems, and more specifically to a stereo camera intrusion detection system.

BACKGROUND

In modern society and throughout recorded history, there has always been a demand for security measures. Such measures have been used to prevent theft, unauthorized access to sensitive materials and areas, and in a variety of other applications. One such common security measure includes intrusion detection systems. Typically, intrusion detection systems incorporate video surveillance that includes monitoring video feeds acquired by one or more video cameras that are situated around a perimeter of a facility sought to be protected. The monitoring of the video feeds is typically accomplished by a human, such as by security personnel or by the police. However, because potential security threats are isolated events amidst long, otherwise uneventfull time spans, boredom can be a significant problem, thus resulting in lapses of security.

To overcome the problem of boredom, some automated intrusion detection systems have been developed. Such automated systems can incorporate various computer vision algorithms to assist human monitoring. Typically, a change detection algorithm is used to identify regions within the monitored area that may merit more careful review by the monitoring human. However, such systems can be highly prone to registering false positives, such as resulting from environmental variation, for example distant background changes, wind-blown shrubbery, camera vibration, changing brightness from passing clouds, and moving light beams at night. As such, the resultant high rate of false positives can fatigue even the most experienced human security monitors. To overcome the false positive conditions, some systems may allow an operator to draw null zones that prohibit activity in the null zone from tripping the alarm. However, such a solution can provide an opportunity for a false negative result, thus resulting in a lapse in security.

In addition to the problems associated with boredom, typical automated intrusion detection systems can suffer from a number of additional drawbacks. For example, camera based intrusion detection systems typically include a camera that is mounted at a greatly elevated position looking down. As such, it can determine a location of an intruder based solely on the location of the intruder on the ground within the field of view of the camera. However, such an arrangement can be difficult to install and maintain, and can be expensive by requiring special mounting equipment and accessories. In addition, such systems may have a limited field of view. As such, an intruder may be able to see such systems before the intruder is detected, thus allowing the intruder an opportunity to take advantage of blind-spots, or devise other counter-measures to defeat the automated intrusion detection system.

SUMMARY

One embodiment of the present invention includes an intrusion detection system. The intrusion detection system comprises a first camera configured to acquire first images of a monitored area and a second camera configured to acquire second images of the monitored area. The intrusion detection system also comprises a detection device configured to compare the first images with a background image of the monitored area. The detection device can mark differences between the first images and the background image as a potential intruder. The intrusion detection system further comprises a tracking device configured to evaluate each of the first images relative to each of the second images to determine three-dimensional characteristics associated with the potential intruder.

Another embodiment of the present invention includes a method for detecting intruders in a monitored area. The method comprises acquiring first images of the monitored area from a first camera, acquiring second images of the monitored area from a second camera, and generating a background image of the monitored area. The method also comprises correlating first pixels associated with the first images with second pixels associated with the background image of the monitored area, such that the first pixels are horizontally and vertically aligned with the second pixels. The method also comprises comparing the first images and the background image of the monitored area to determine the presence of a potential intruder. The method further comprises determining three-dimensional characteristics of the potential intruder based on a relative comparison of the first images and the second images, and activating an indicator upon the three-dimensional characteristics of the potential intruder exceeding at least one predetermined threshold.

Another embodiment of the present invention includes an intrusion detection system. The intrusion detection system comprises means for simultaneously acquiring first images and second images of a monitored area. The intrusion detection system also comprises means for continuously generating a background image of the monitored area. The intrusion detection system also comprises means for detecting a potential intruder based on differences between the first images and the background image. The intrusion detection system further comprises means for determining three-dimensional characteristics of the potential intruder based on the first images and the second images, and means for activating an indicator based on the three-dimensional characteristics of the potential intruder.

DETAILED DESCRIPTION

The present invention relates generally to intrusion detection systems, and more specifically to a stereo camera intrusion detection system. A pair of stereo cameras each acquire concurrent images of the monitored area. The acquired images from one or both of the cameras can be compared with a background image. Thus, the background image can be generated from one of the cameras, or the cameras can be compared with separate background images. The background image can be constantly updated based on each of the acquired images to slowly account for subtle changes in the monitored area environment. In addition, the background image can be correlated with each of the acquired images, such that the pixels of each of the acquired images and the background image can be horizontally and vertically aligned.

Upon detecting a difference in the acquired images and the background image, the pixels that are different can be outlined as a potential intruder. The acquired images from each of the cameras can be correlated to determine a parallax separation of the two-dimensional location of the potential intruder in the acquired image from one camera relative to the other. Upon determining the parallax separation, a three-dimensional location, size, and movement of the potential intruder can be determined. The location, size, and/or movement of the potential intruder can be compared with at least one predetermined threshold, and an indicator can be sounded upon the potential intruder exceeding the predetermined threshold.

Figure 1:
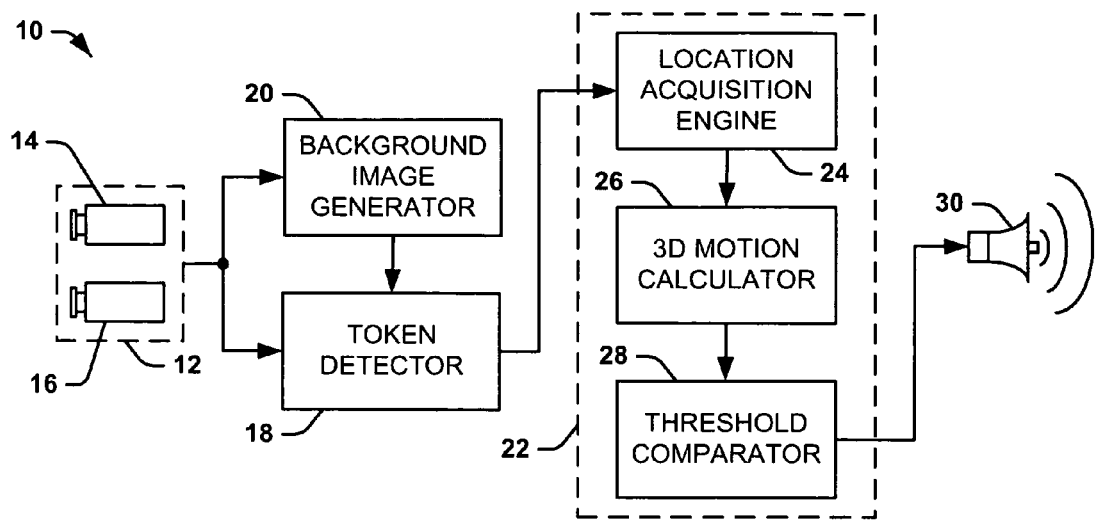
FIG. 1 illustrates an example of a stereo camera intrusion detection system in accordance with an aspect of the invention.

FIG. 1 illustrates an example of a stereo camera intrusion detection system 10 in accordance with an aspect of the invention. The stereo camera intrusion detection system 10 includes a stereo image acquisition stage 12, including a first camera 14 and a second camera 16. The first camera 14 and the second camera 16 can be digital cameras. Alternatively, the first camera 14 and the second camera 16 can be analog camera images, such that the images acquired from the first camera 14 and the second camera 16 can be output to a digitizer (not shown). The first camera 14 and the second camera 16 can be configured to concurrently acquire images of the same monitored area. As such, the first camera 14 and the second camera 16 operate in stereo relative to each other, such that they can be mounted close to each other (e.g., 1 meter). The acquired images can each be separately obtained frames gathered at a rapid rate (e.g., 15 frames per second) by the respective first camera 14 and second camera 16. The first camera 14 and the second camera 16 can thus acquire substantially similar images that differ only in respective points-of-view based on their respective physical separation. As such, the stereo image acquisition stage 12 can detect a three-dimensional location of a potential intruder, as will be described in greater detail below.

The ability to detect the three-dimensional location of a potential intruder can provide for an optimal placement of the stereo image acquisition stage 12. As the stereo camera intrusion detection system 10 is able to detect the three-dimensional location of the potential intruder, it is not necessary to mount the stereo image acquisition stage 12 in an elevated location. Instead, the stereo image acquisition stage 12 could be mounted at approximately floor level and parallel to the floor. Such a mounting arrangement can be significantly less expensive than an elevated placement, and is far less conspicuous than an elevated placement. As such, potential intruders may not be able to detect the stereo image acquisition stage 12, and could thus be deprived of the opportunity to hide or perform defeating counter-measures.

The acquired images are output from the stereo image acquisition stage 12 to a token detector 18. The token detector 18 is configured to compare the acquired images from the first camera 14 and/or the second camera 16 with a background image. As will be described below in greater detail, the token detector 18 can determine the presence of a potential intruder based on the differences between the pixels associated with each of the acquired images from the first camera 14 and/or the second camera 16 and the pixels associated with the background image. In addition or alternatively, as will also be described below in greater detail, the token detector 18 can determine the presence of a potential intruder based on differences in texture between the acquired images from the first camera 14 and/or the second camera 16 and the background image.

The background image can be generated by a background image generator 20. The background image generator 20 is demonstrated in the example of FIG. 1 as receiving an input from the stereo image acquisition stage 12. The input could be an input from the first camera 14, the second camera 16, or both the first camera 14 and the second camera 16. Thus, the background image generator 20 can generate a background image based on an acquired image from the first camera 14, the second camera 16, or can generate separate background images, one from each of the first camera 14 and the second camera 16.

The background image generator 20 can be continuously generating the background image by periodically updating the background image with a plurality of pixels of the acquired images from the first camera 14 and/or the second camera 16. As such, gradual environment changes in the monitored area, such as shadows cast by the passing sun, can be incorporated into the background image. The stereo camera intrusion detection system 10 thus may not register a false positive based on the gradual environment changes. In addition, the background image generated by the background image generator 20 can be stabilized. The stabilized background image can be horizontally and vertically aligned with the acquired images from the first camera 14 and/or the second camera 16 to compensate for camera bounce, as will be described in greater detail in the example of FIG. 2 below.

For each of the acquired images from each of the first camera 14 and the second camera 16, the token detector 18 can generate a difference image that demonstrates an absolute value of the pixel difference between the respective acquired image and the background image. The token detector 18 can then perform a pixel filling algorithm on the difference image, such that pixels that the difference pixels that are close together on the difference image can be connected to demonstrate a candidate token. The candidate token could represent a potential intruder.

Figure 7:
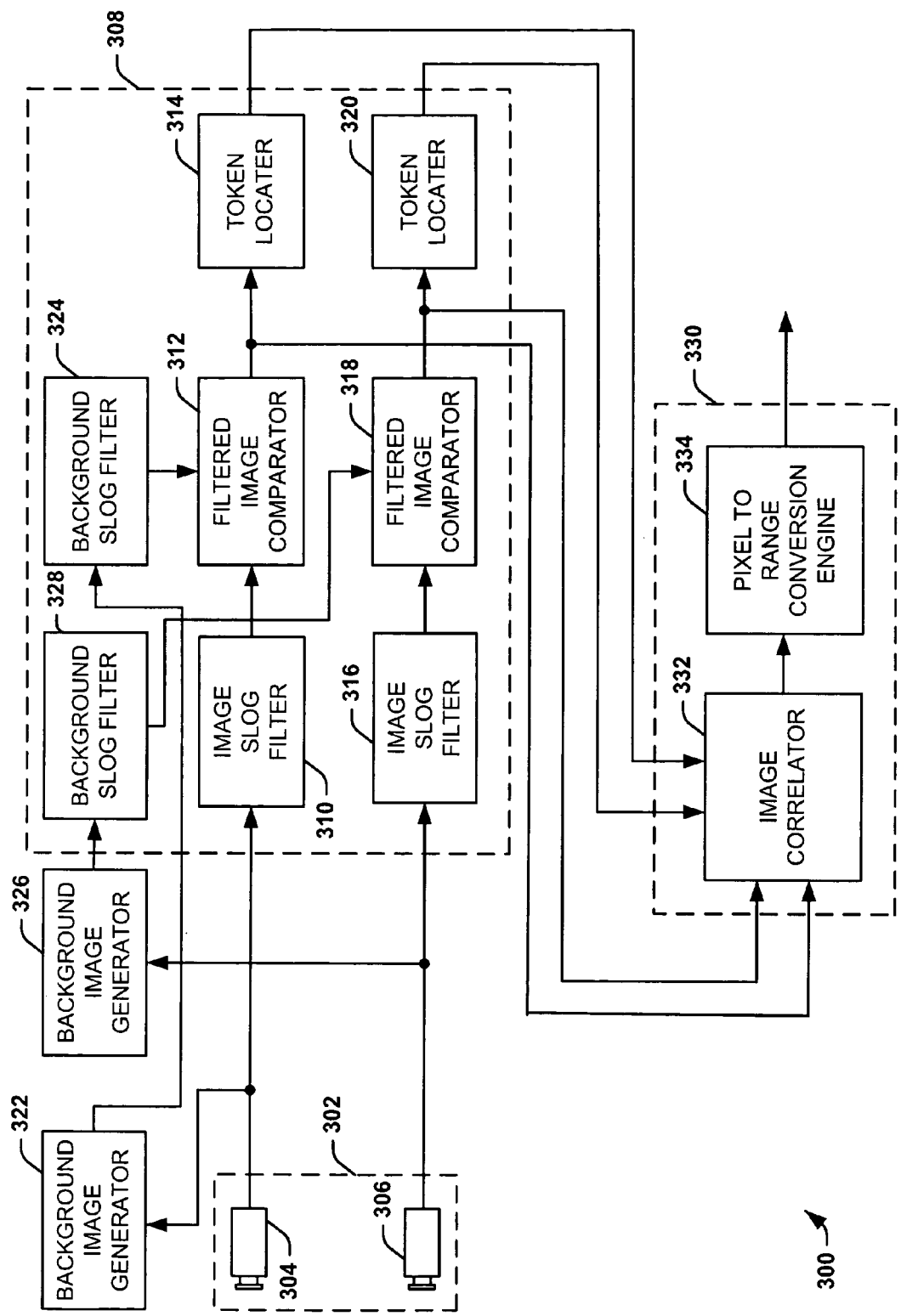
FIG. 7 illustrates another example of a stereo camera intrusion detection system in accordance with an aspect of the invention.

In an alternative embodiment, as demonstrated in the example of FIG. 7, the token detector 18 can include an image filter algorithm, such that the acquired images from the first camera 14, the second camera 16, and the background image can all be filtered. The filtered images from the first camera 14 and the second camera 16 can be compared with the filtered background image by the token detector 18 to determine changes in texture between the acquired images from the first camera 14 and the second camera 16, respectively, with the background image. In such a way, brightness and contrast differences between the acquired images and the background image can be ignored by the stereo camera intrusion detection system 10. The texture differences between the filtered images from the first camera 14 and the second camera 16 and the filtered background image can be the candidate token, which could represent the potential intruder. However, the token detector 18 could additionally evaluate the candidate token using an absolute value pixel difference as a way to redundantly determine the presence of the potential intruder.

The stereo camera intrusion detection system 10 also includes an image tracker 22. The image tracker 22 includes a location acquisition engine 24, a three-dimensional motion calculator 26, and a threshold comparator 28. The token detector 18 communicates the location of the candidate token to the location acquisition engine 24. In addition, the stereo image acquisition stage 12 can transmit the images obtained by one or both of the first camera 14 and the second camera 16 to the location acquisition engine 24. The location acquisition engine 24 is configured to determine a three-dimensional location and size associated with the potential intruder. For example, the location acquisition engine 24 can combine the images obtained from the first camera 14 with the images obtained from the second camera 16. The location acquisition engine 24 can then apply a correlation algorithm to the respective images obtained from the first and second cameras 14 and 16 to determine a relative two-dimensional location of the candidate token in the images obtained by the first camera 14 relative to the images obtained by the second camera 16. Thus, the location acquisition engine 24 can determine the three-dimensional location and size of the potential intruder based on a parallax separation of the potential intruder in the images obtained by the first camera 14 relative to the second camera 16.

In determining the parallax separation of the potential intruder, the location acquisition engine 24 can apply an image filtering algorithm to each of the images obtained by the first camera 14 and the second camera 16 to obtain first filtered images and second filtered images, respectively. The filtering algorithm could be, for example, a Sign of Laplacian of Gaussian (SLOG) filtering algorithm. In addition, the location acquisition engine 24 could apply multiple filtering algorithms to each image from the first camera 14 and the second camera 16, such that each filtered image could have a different resolution. The location acquisition engine 24 could then overlay the first filtered images onto the second filtered images and apply the correlation algorithm. The overlay could include overlaying the candidate token in the first filtered images over an approximate location of the potential intruder in the second filtered images, as communicated from the token detector 18. In the example of a stereo camera intrusion detection system 10 determining a candidate token on the images obtained by both the first camera 14 and the second camera 16, the location acquisition engine 24 may not apply the image filtering algorithm, but may simply overlay the difference image from the first camera 14 onto the difference image from the second camera 16 before applying the correlation algorithm.

As an example, the correlation algorithm could include an iterative pixel shift algorithm that shifts the first filtered image relative to the second filtered image by at least one pixel per shift and compares the first filtered images to the respective second filtered images at each respective shift. The comparison could include determining a correlation score for each shift. Upon determining a shift having a highest correlation score, the location acquisition engine 24 can determine the parallax separation of the potential intruder based on a number of pixels of offset between the first images and the second images. The location acquisition engine 24 could then convert the number of pixels of offset to a unit of measure in three-dimensional space to determine a three-dimensional location and size of the potential intruder.

It is to be understood that, in determining a three-dimensional location and size of a potential intruder, the location acquisition engine 24 evaluates a given image from the first camera 14 relative to a respective image from the second camera 16 that is acquired at substantially the same time. As such, the location acquisition engine 24 outputs the three-dimensional location and size information associated with each frame of the acquired images from the first camera 14 and the second camera 16 to the three-dimensional motion calculator 26. The three-dimensional motion calculator 26 can track changes in the three-dimensional location and size of the potential intruder across multiple images, and thus multiple frames, of the first camera 14 and the second camera 16. The changes in the three-dimensional location and size of the potential intruder across the images of the first camera 14 and the second camera 16 can be determinative of three-dimensional motion associated with the potential intruder, such as direction and velocity of motion.

The location, size, and motion information associated with the potential intruder can be output to the threshold comparator 28, which is coupled to an indicator 30. The indicator 30 can, for example, be an audible alarm, a visual indicator, or any of a variety of other indication devices. In addition, the indicator 30 can be coupled to a network, such that the indicator 30 can be located at a facility that is remote from the monitored area, such as a police station. The threshold comparator 28 can be programmed with any of a variety of predetermined threshold conditions sufficient to signal the indicator 30 to an operator (e.g., security guard and/or police officer) of the stereo camera intrusion detection system 10. For example, upon a potential intruder being determined to be a size greater than, for example, the size of a small dog, the threshold comparator 28 could signal the indicator 30. The size threshold could be specific to height, and not just overall size. In such a way, the threshold comparator 28 can ensure that false positive conditions do not result from potential intruders that do not warrant attention by the given operators of the stereo camera intrusion detection system 10, such as birds or rabbits.

The threshold condition could also be indicative of a given velocity of the potential intruder, such that, for example, automobiles traveling at or above a certain speed can signal the indicator 30. In addition, an operator of the stereo camera intrusion detection system 10 can designate three-dimensional portions of the monitored area as threshold zones or null zones. Thus, the threshold comparator 28 can signal the indicator 30 upon the potential intruder moving into or toward a threshold zone. Likewise, the threshold comparator 28 could disable the indicator 30 upon detecting a potential intruder in a null zone, such that three-dimensional portions of the monitored area that are not of particular interest for security monitoring can be disabled. As such, false positive conditions resulting from certain environmental changes, such as swaying branches, can be mitigated. It is to be understood that the threshold comparator 28 can also be programmed to apply any of a number of thresholds, as well as thresholds to be applied in combination. For example, the threshold comparator 28 can be programmed to signal the indicator 30 only when a potential intruder is both a certain predetermined size and is moving a certain predetermined velocity.

It is to be understood that the stereo camera intrusion detection system 10 is not intended to be limited to the example demonstrated in FIG. 1. For example, the stereo camera intrusion detection system 10 can include more than just two stereo cameras in the stereo image acquisition stage 12. In addition, as will be demonstrated in the examples of FIGS. 4, 6, and 7, any of a number of different configurations can be implemented for the stereo camera intrusion detection system 10 in accordance with an aspect of the invention.

Figure 2:
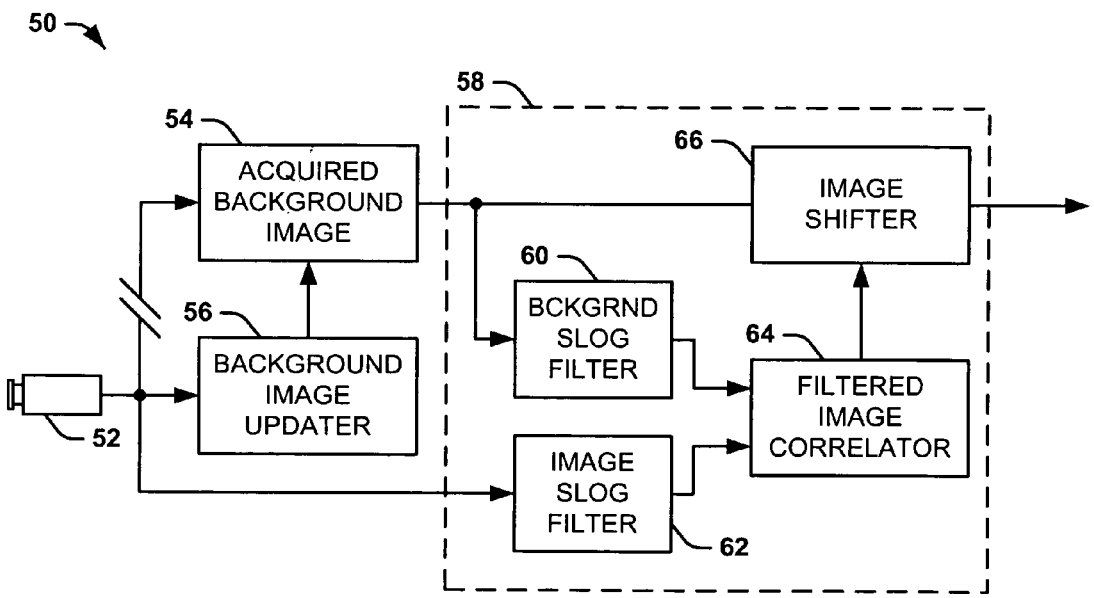
FIG. 2 illustrates an example of a background image generator in accordance with an aspect of the invention.

FIG. 2 illustrates an example of a background image generator 50 in accordance with an aspect of the invention. It is to be understood that the background image generator 50 can be substantially similar to the background image generator 20 in the example of FIG. 1. As such, reference to FIG. 1 and like reference numbers will be used in the following discussion of FIG. 2. The background image generator 50, as demonstrated in the example of FIG. 2, receives image data from a camera 52, which could be either the first camera 14 or the second camera 16 in the example of FIG. 1. A single frame from the camera 52 can be used to generate an acquired background image 54. The acquired background image 54 could be an image of the monitored area taken at a predetermined time. For example, an operator of the stereo camera intrusion detection system in which the background image generator 50 is used can provide an input to the background image generator 50 to generate the acquired background image 54 upon determining that there are no intruders in the monitored area. Additionally, the background image generator 50 could periodically generate the acquired background image 54 at predetermined times, such as, for example, once every minute, to account for gradual changes in environmental conditions, such as passing clouds.

The background image generator 50 also includes a background image updater 56. The background image updater 56 periodically receives inputs from the camera 52 to update the acquired background image 54 to account for gradual changes occurring within the monitored area. For example, the background image updater 56 can periodically add a plurality of pixels from the images acquired by the camera 52 to the acquired background image 54. It is to be understood that compromises can be made in determining the speed at which the acquired background image 54 is updated. For example, if the acquired background image 54 is updated too rapidly, then a potential intruder could become part of the acquired background image 54, thus resulting in a possible false negative result. Conversely, if the acquired background image 54 is updated too slowly, then the gradual changes in the environment of the monitored area could result in the generation of candidate tokens, thus resulting in a possible false positive result. As such, the background image updater 56 can be programmable as to the amount of pixels added to the acquired background image 54, as well as how often the pixels are added to the acquired background image 54.

As described above regarding the stereo camera intrusion detection system 10 in the example of FIG. 1, the token detector 18 can be configured to apply an absolute value pixel difference algorithm to generate a difference image. Thus, the difference image is an absolute value pixel difference between the background image and each of the images acquired by the respective one of the first camera 14 and/or the second camera 16. As such, a slight variation in horizontal and/or vertical alignment between the image acquiring camera and the background image can result in a difference image that demonstrates significant variation, despite there being substantially no changes in the actual monitored area. This alignment mismatch can occur from camera bounce, such that the image acquiring camera has moved slightly due to wind, vibration, or any of a variety of other factors. The movement could cause the acquired images to be offset from the background image by one or more pixels in a given direction, which could result in a difference image demonstrating an extreme variation between the acquired images and the background image, thus giving rise to false positive intruder detection.

To account for camera bounce, the background image generator 50 includes a background image stabilizer 58. The background image stabilizer 58 is configured to vertically and horizontally align the acquired images of the camera 52 relative to the acquired background image 54, such that the acquired background image 54 is stabilized. The background image stabilizer 58 receives each acquired image from the camera 52 and the acquired background image 54 as inputs. The acquired background image 54 is input to a background Sign of Laplacian of Gaussian (SLOG) filter 60 and the acquired images from the camera 52 are each input to an image SLOG filter 62. It is to be understood that the background SLOG filter 60 and the image SLOG filter 62 are not limited to SLOG filters, but could be any of a variety of bandpass image filters. The background SLOG filter 60 and the image SLOG filter 62 operate to convert the respective images into filtered images, such that the filtered images highlight texture contrasts. It is also to be understood that the acquired background image 54 may only be input to the background SLOG filter 60 upon every update by the background image updater 56.

Figure 3:
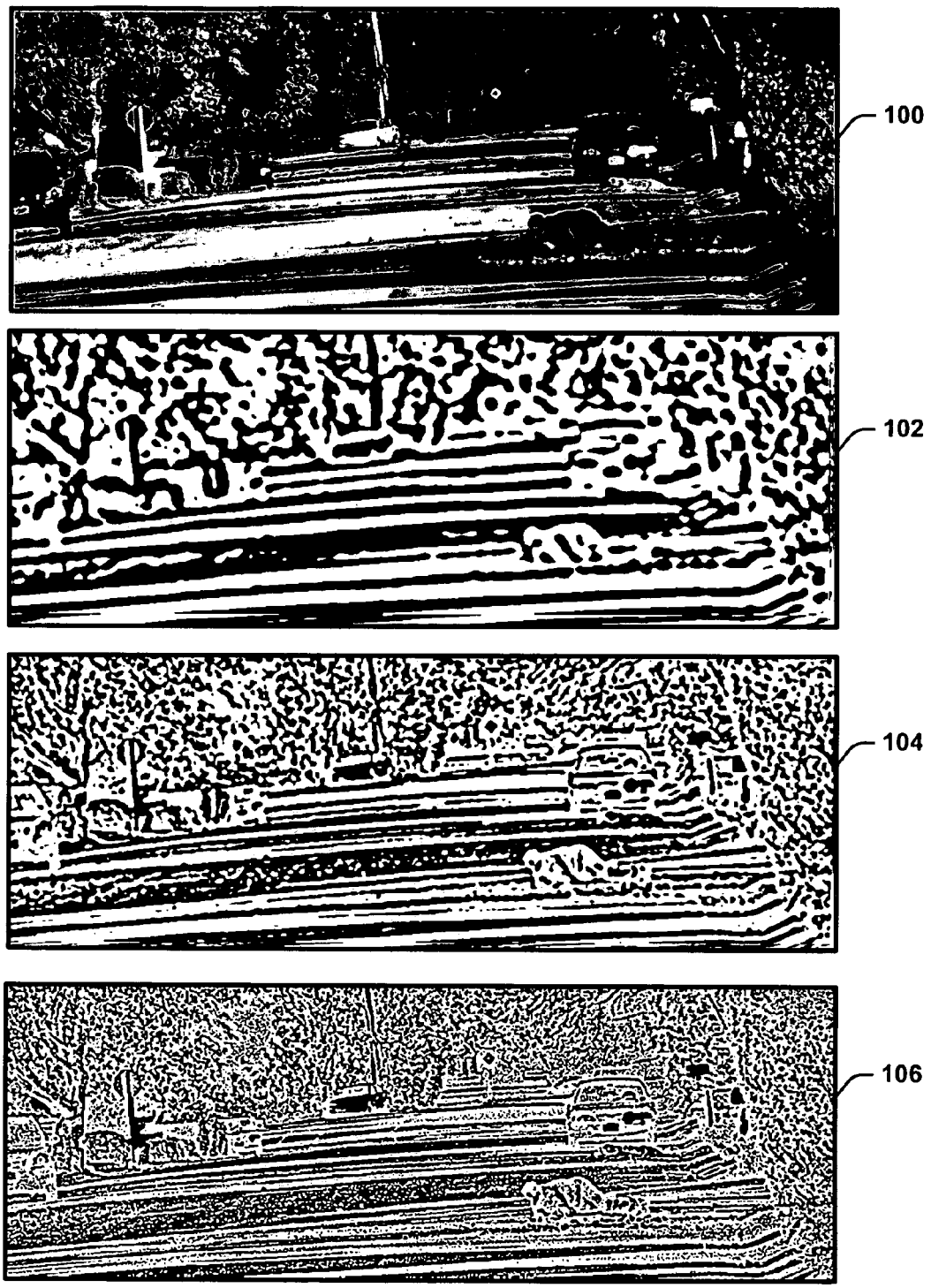
FIG. 3 illustrates an example of a camera image and filtered images of the camera image in accordance with an aspect of the invention.

FIG. 3 illustrates an example of a camera image 100 and a first filtered image 102, a second filtered image 104, and a third filtered image 106 of the camera image 100 in accordance with an aspect of the invention. In the example of FIG. 3, the first filtered image 102, a second filtered image 104, and a third filtered image 106 are each SLOG filtered images of the camera image 100. The filtered images 102, 104, and 106 demonstrate black and white pixel patterns of textural contrasts of the camera image 100, and as such are not representative of changes in brightness of the camera image 100. As such, shadows from passing clouds and other brightness patterns are not detected in SLOG filtered images, such as the images 102, 104, and 106.

The first filtered image 102, a second filtered image 104, and a third filtered image 106 each have varying degrees of resolution in demonstrating binary texture contrasts of the camera image 100. The first filtered image 102 is a low-resolution filtered representation of the camera image 100, the second filtered image 104 is a medium-resolution filtered representation of the camera image 100, and the third filtered image 106 is a high-resolution filtered representation of the camera image 100. A given SLOG filter, such as the background SLOG filter 60 and the image SLOG filter 62 in the example of FIG. 2, can be tuned to provide the varying degrees of binary texture resolution as demonstrated in the example of FIG. 3. As is demonstrated in the example of FIG. 3, the filtered image 106 defines a more accurate binary texture pattern of the camera image 100 than the filtered images 102 and 104. However, the filtered image 106 may be more susceptible to noise in filtering the camera image 100.

Referring back to FIG. 2, the background SLOG filter 60 and the image SLOG filter 62 may only apply a coarse filtering operation, such as the filtered image 102, to the acquired background image 54 and the visual images received from the camera 52. The filtered images are output, respectively, from the background SLOG filter 60 and the image SLOG filter 62 to a filtered image correlator 64. The filtered image correlator 64 overlays the filtered acquired background image onto the filtered acquired visual image. The filtered image correlator 64 then iteratively shifts the filtered acquired background image one pixel at a time over the filtered acquired visual image.

At every pixel shift, the filtered image correlator 64 can determine a correlation score. The correlation score can be representative of how well the filtered acquired background image is aligned with the filtered acquired visual image based on how many of the binary texture pattern pixels agree. The shifting can be in both the vertical and horizontal directions, and shifting can occur across the entire image or across a portion of the image, such that positive and negative pixel shift bounds can be set in both the vertical and horizontal directions. The pixel shift resulting in the highest correlation score can be representative of the appropriate alignment between the filtered acquired background image and the filtered acquired visual image. It is to be understood that the filtered image correlator 64 can perform the correlation for each filtered acquired visual image associated with each frame of the camera 52, relative to the filtered acquired background image.

Upon determining the appropriate correlation between the filtered acquired background image and the filtered acquired visual image, the filtered image correlator 64 communicates the number of pixels shifted to achieve correlation to an image shifter 66. The image shifter 66 receives the acquired background image 54 and shifts the acquired background image 54 by the number of pixels communicated to it by the filtered image correlator 64. The shifted acquired background image is then output from the image shifter 66 to a token detector, such as the token detector 18 demonstrated in the example of FIG. 1. In such a way, the background image can be stabilized to reduce false positive intrusion detection resulting from absolute value pixel differences in a difference image based on a lack of horizontal and vertical alignment between the background image and the acquired visual images from a respective camera.

It is to be understood that the background image generator 50 is not limited to the example of FIG. 2. For example, some or all of the components of the background image stabilizer 58 may be integrated together. As another example, the image shifter 66 may reside in the respective token detector, such that the background image stabilizer 58 outputs the pixel alignment information to the token detector. In addition, as yet another example, the filtered image correlator 64 may correlate the filtered acquired visual image relative to the filtered acquired background image, and could communicate pixel shift information to the token detector. As such, each acquired visual image can be shifted relative to the background image in the token detector, instead of shifting the acquired background image.

Figure 4:
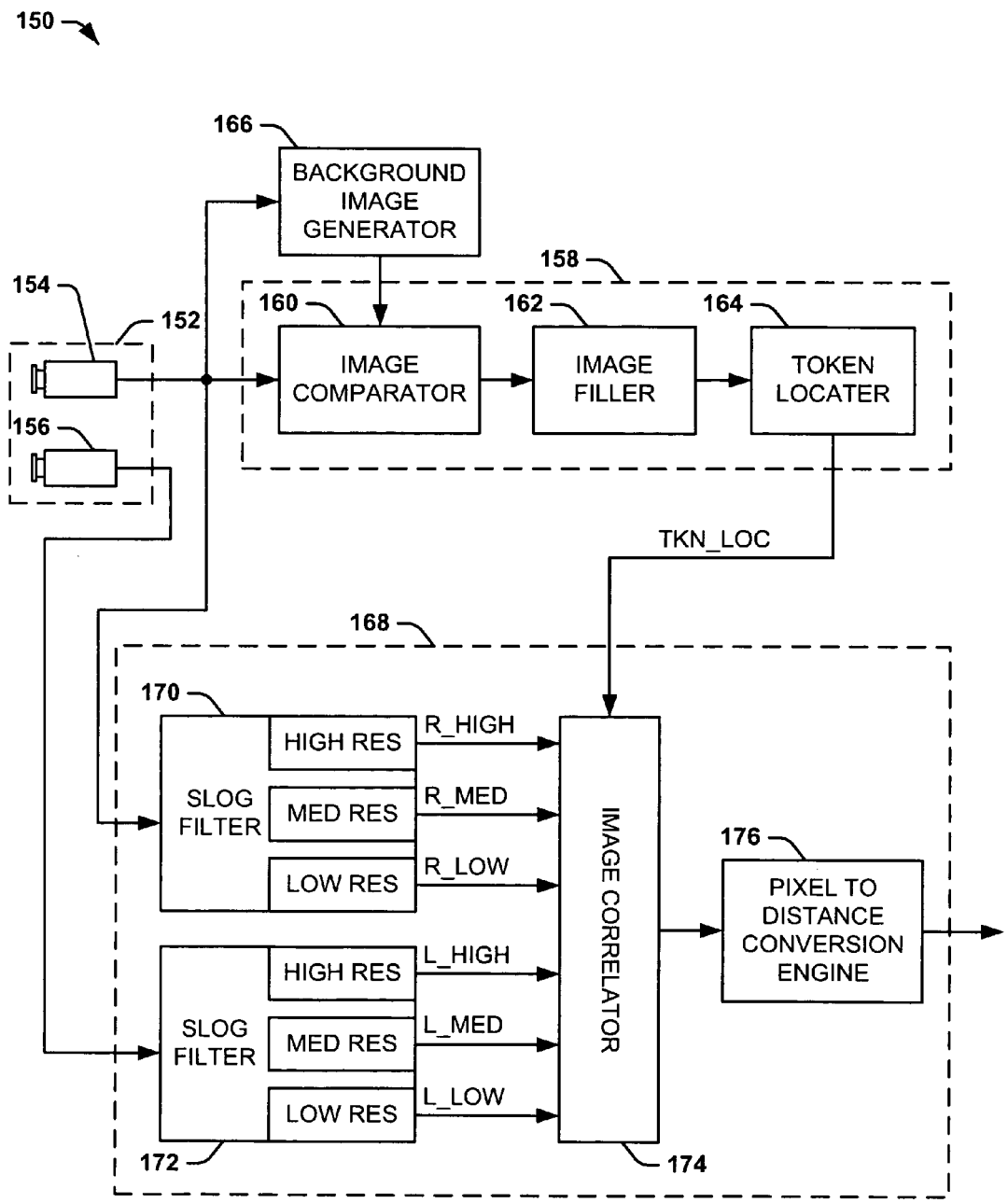
FIG. 4 illustrates another example of a stereo camera intrusion detection system in accordance with an aspect of the invention.

FIG. 4 illustrates another example of a stereo camera intrusion detection system 150 in accordance with an aspect of the invention. The stereo camera intrusion detection system 150 includes a stereo image acquisition stage 152, including a first camera 154 and a second camera 156. The first camera 154 and the second camera 156 can be digital cameras. The first camera 154 and the second camera 156 can be configured to concurrently acquire images of the same monitored area. As such, the first camera 154 and the second camera 156 operate in stereo relative to each other, such that they can be mounted close to each other (e.g., 1 meter). The acquired images can each be separately obtained frames gathered at a rapid rate (e.g., 15 frames per second) by the respective first camera 154 and second camera 156.

The stereo camera intrusion detection system 150 includes a token detector 158. The token detector 158 includes an image comparator 160, an image filler 162, and a token locater 164. The visual images acquired by the camera 154 are output to the image comparator 160. The image comparator 160 is configured to compare the acquired images from the first camera 154 with a background image generated from a background image generator 166. The background image generator 166 can be substantially similar to the background image generator 50 as described in the example of FIG. 2 above. As such, the background image output from the background image generator 166 can be substantially vertically and horizontally aligned with the acquired images output from the camera 154.

The image comparator 160 applies an absolute value pixel difference algorithm to generate a difference image. The pixel differences can be based on texture, brightness, and color contrast. The difference image thus demonstrates substantially all the pixels that are different between each of the acquired images from the camera 154 and the background image. It is to be understood that the image comparator 160 thus generates a difference image for each of the images corresponding to each of the frames output from the camera 154.

The difference image alone, however, may not be able to accurately portray an absolute value pixel image of a potential intruder. For example, an intruder wearing black may sneak in front of a dark background surface in the monitored area. The image comparator 160 may be able to distinguish the intruder's hands, face, and shoes in applying the absolute value pixel difference algorithm, but there may be parts of the intruder's body in the acquired images that are indistinguishable by the image comparator 160 from the background image. As such, the image comparator 160 outputs the difference image to the image filler 162.

The image filler 162 applies a pixel filling algorithm to the difference image, such that it can be determined whether a candidate token exists. The pixel filling algorithm connects pixels that are close together in the difference image, such that connected pixels can take shape for determination of the presence of a candidate token. For example, the image filling algorithm could begin with a horizontal fill, such as left-right on the difference image, such that pixels on a horizontal line that are within a certain predefined pixel distance from each other can be connected first. The predefined pixel distance can be tuned in such a way as to prevent nuisance fills that could result in false positive results. The image filling algorithm could then apply a similar operation in the vertical direction on the difference image. As a result, closely-grouped disjointed pixels can be filled in to account for inaccuracies in detecting the absolute value pixel difference that can result. Thus, in the above example of the camouflaged intruder, the intruder can still be found, as the intruder's hands, face, and shoes can be filled in to form a two-dimensional pixelated "blob" on the difference image.

The filled-in difference image is output from the image filler 162 to the token locater 164. The filled-in pixel group on the filled-in difference image can be examined by the token locater 164. If the filled-in pixel group, such as the two-dimensional pixelated "blob" of the intruder, exceeds predefined shape thresholds, the token locater 164 can mark the filled-in pixel group as a candidate token. The token locater 164 thus determines the pixel coordinates pertaining to the candidate token location on the filled-in difference image and communicates the two-dimensional pixel location information of the candidate token, as a signal TKN_LOC, to a location acquisition engine 168. The candidate token, as described above in the example of FIG. 1, could correspond to a potential intruder.

The acquired images of each of the cameras 154 and 156 are also output to the location acquisition engine 168. The location acquisition engine 168, similar to that described above in the example of FIG. 1, is configured to determine a three-dimensional location and size of a potential intruder, and could be part of an image tracker that also includes a three-dimensional motion calculator and a threshold comparator. Specifically, the camera 154 outputs its respective acquired images to a first Sign of Laplacian of Gauusian (SLOG) filter 170 and the second camera 156 outputs its respective acquired images to a second SLOG filter 172. In the example of FIG. 4, each of the first SLOG filter 170 and the second SLOG filter 172 apply multiple SLOG filtering operations on each of the acquired images from each of the first camera 154 and the second camera 156, respectively. Specifically, the SLOG filters 170 and 172 perform a low-resolution SLOG filtering operation, a medium-resolution SLOG filtering operation, and a high-resolution SLOG filtering operation on each of the acquired images. These SLOG filtering operations could correspond, respectively, to the first filtered image 102, the second filtered image 104, and the third filtered image 106 demonstrated in the example of FIG. 3 above. The first SLOG filter outputs a high-resolution filtered image R_HIGH, a medium-resolution filtered image R_MED, and a low-resolution filtered image R_LOW to an image correlator 174. The second SLOG filter outputs a high-resolution filtered image L_HIGH, a medium-resolution filtered image L_MED, and a low-resolution filtered image L_LOW to the image correlator 174. As such, the compromise between image accuracy and noise, as described above in the example of FIG. 3, can be appropriately accounted for in the determination of the three-dimensional location of the potential intruder.

Figure 5:
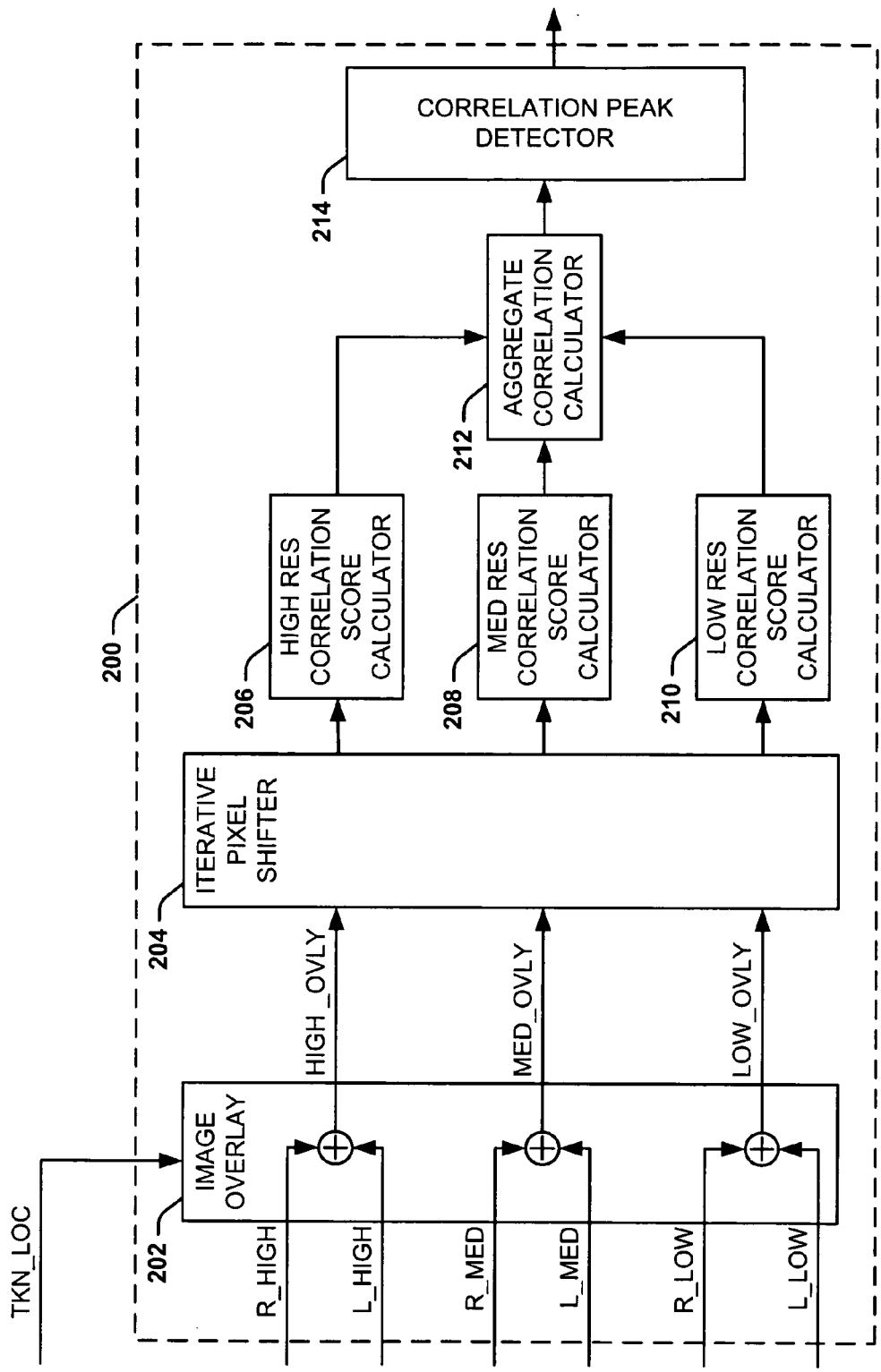
FIG. 5 illustrates an example of an image correlator in accordance with an aspect of the invention.

FIG. 5 illustrates an example of an image correlator 200 in accordance with an aspect of the invention. The image correlator 200 in the example of FIG. 5 can represent the image correlator 174 in the example of FIG. 4. As such, reference to FIG. 4, as well as like reference numbers, will be used in the following discussion regarding the example of FIG. 5. The image correlator 200 includes an image overlay combiner 202. The image overlay combiner 202 receives the filtered images output from the first SLOG filter 170 and the second SLOG filter 172 and overlays pairs of the filtered images, such that filtered image pairs of the same resolution are overlayed. For example, the high-resolution filtered image R_HIGH from the camera 154 is overlayed onto the high-resolution filtered image L_HIGH from the camera 156. Likewise, the medium-resolution filtered image R_MED from the camera 154 is overlayed onto the medium-resolution filtered image L_MED from the camera 156. Likewise, the low-resolution filtered image R_LOW from the camera 154 is overlayed onto the low-resolution filtered image L_LOW from the camera 156. The image overlay combiner 202 also receives the signal TKN_LOC, such that the filtered images R_HIGH, R_MED, and R_LOW can be overlayed onto the filtered images L_HIGH, L_MED, and L_LOW, respectively, at a location that corresponds with an approximate location of the potential intruder on the respective filtered images L_HIGH, L_MED, and L_LOW. The pixel location of the overlay can be the same for each of the filtered image pairs.

The three overlayed filtered image pairs are output from the image overlay combiner 202 to an iterative pixel shifter 204. In the example of FIG. 5, the high-resolution overlayed filtered image pair is demonstrated as HIGH_OVLY, the medium-resolution overlayed filtered image pair is demonstrated as MED_OVLY, and the low-resolution overlayed filtered image pair is demonstrated as LOW_OVLY. It is to be understood that, in the example of FIG. 5, HIGH_OVLY, MED_OVLY, and LOW_OVLY are separate image pairs, and are thus not actual combined images. The iterative pixel shifter 204 applies a pixel shifting correlation algorithm to each of the filtered image pairs, similar to the correlation operation described above for the filtered image correlator 64 in the example of FIG. 2. However, the iterative pixel shifter 204 can shift each filtered image pair substantially concurrently and equally.

For each pixel shift, a high-resolution correlation score calculator 206, a medium-resolution correlation score calculator 208, and a low-resolution correlation score calculator 210 calculates a correlation score for each of the respective filtered image pairs. Because each of the filtered image pairs have a different resolution relative to each other, the correlation scores for each of the respective filtered image pairs may be different, despite the pixel shifting of each of the filtered image pairs being the same. For example, concurrently shifting each of the filtered images R_HIGH, R_MED, and R_LOW relative to the respective filtered images L_HIGH, L_MED, and L_LOW by one pixel in the +X direction could yield a separate correlation score for each of the filtered image pairs. It is to be understood that, in the example of FIG. 5, the correlation score can be representative of the number of filtered image pixels of the candidate token that agree with pixels of the filtered image associated with the camera 156. As such, the highest correlation score may result in the pixels of the candidate token being shifted onto the corresponding pixel location of the candidate token in the opposing other filtered image. Thus, it is to be understood that a correlation score may be obtained prior to any shifting because the filtered images can be overlayed at approximate pixel locations of the candidate token on each of the respective filtered images.

To account for separate correlation scores, the high-resolution correlation score calculator 206, the medium-resolution correlation score calculator 208, and the low-resolution correlation score calculator 210 each output the respective correlation scores to an aggregate correlation calculator 212. The aggregate correlation calculator 212 can determine an aggregate correlation score based on the separate respective resolution correlation scores. The aggregate correlation calculator 212 can be programmed to determine the aggregate correlation score in any of a variety of ways. As an example, the aggregate correlation calculator 212 can add the correlation scores, can average the correlation scores, or can apply a weight factor to individual correlation scores before adding or averaging the correlation scores. As such, the aggregate correlation score can be determined for each pixel shift in any way suitable for the correlation determination.

The aggregate correlation score is output from the aggregate correlation calculator to a correlation score peak detector 214. The correlation score peak detector 214 compares the aggregate correlation scores for each shift of the filtered image pairs and determines which shift is the optimal shift for correlation. Upon determining the shift that corresponds to the best correlation for the filtered image pairs, the correlation score peak detector 214 outputs the number of pixels of offset of the filtered image pair for optimal correlation.

It is to be understood that the image correlator 200 is not limited to the example of FIG. 5. For example, the image overlay combiner 202 may not receive an input from the token locater 164, such that the filtered images are not overlayed at the approximate pixel location of the candidate token. As an example, the image combiner could overlay the filtered images at opposing pixel edges, such that the iterative pixel shifter sweeps one filtered image across the entirety of another to determine correlation. As another example, the filtered image pairs can be overlayed such that they are horizontally and vertically aligned and pixel shifted in a spiral pattern from the respective image centers. In addition, the image correlator 200 may not receive three separate filtered image pairs, but could receive more or less in correlating the images of the first camera 154 and the second camera 156 to determine the three-dimensional location of the potential intruder. Furthermore, some of the devices demonstrated in the example of FIG. 5 may be integrated together as a single device.

Referring back to FIG. 4, the number of pixels of offset between the filtered images in a filtered image pair for optimal correlation is output from the image correlator 174 to a dimension conversion engine 176. The dimension conversion engine 176 examines the pixel offset in the correlation of the filtered image pair and converts the pixel offset into a unit of measure that corresponds to an amount of range that the potential intruder is away from the stereo image acquisition stage 152. The number of pixels of offset may be inversely proportional to the range, such that a large number of pixels of offset may correspond to a range that is closer to the stereo image acquisition stage 152, while a small number of pixels of offset may correspond to a range that is further away from the stereo image acquisition stage 152. It is to be understood that the dimension conversion engine 176 may be pre-calibrated to properly associate the pixel offset to range. For example, a stationary object located at a predetermined range from the stereo image acquisition stage 152 in the monitored area can be used for calibrating the pixel offset to range conversion.

The determination of range of the potential intruder thus directly corresponds to a three-dimensional location of the potential intruder relative to the stereo acquisition stage 152. Upon determining the three-dimensional location of the potential intruder, the dimension conversion engine 176 can determine a size of the potential intruder. For example, upon determining the three-dimensional location of the potential intruder, a number of pixels of dimension of the candidate token in the vertical and horizontal directions can be converted to the unit of measure used in determining the range. As such, a candidate token that is only a couple of pixels wide and is determined to be two meters away from stereo image acquisition stage 152 could be a mouse. A candidate token that is the same number of pixels wide and is determined to be hundreds of meters away could be an automobile. Therefore, the three-dimensional location and size of the potential intruder is determined based on a parallax separation of the two-dimensional location of the potential intruder (i e., the candidate token) in an image acquired by the first camera 154 relative to the two-dimensional location of the potential intruder in the image acquired by the second camera 156. The three-dimensional location and size data can be output from the dimension conversion engine 176 to a three-dimensional motion calculator and/or a threshold comparator, as described above regarding the example of FIG. 1.

Figure 6:
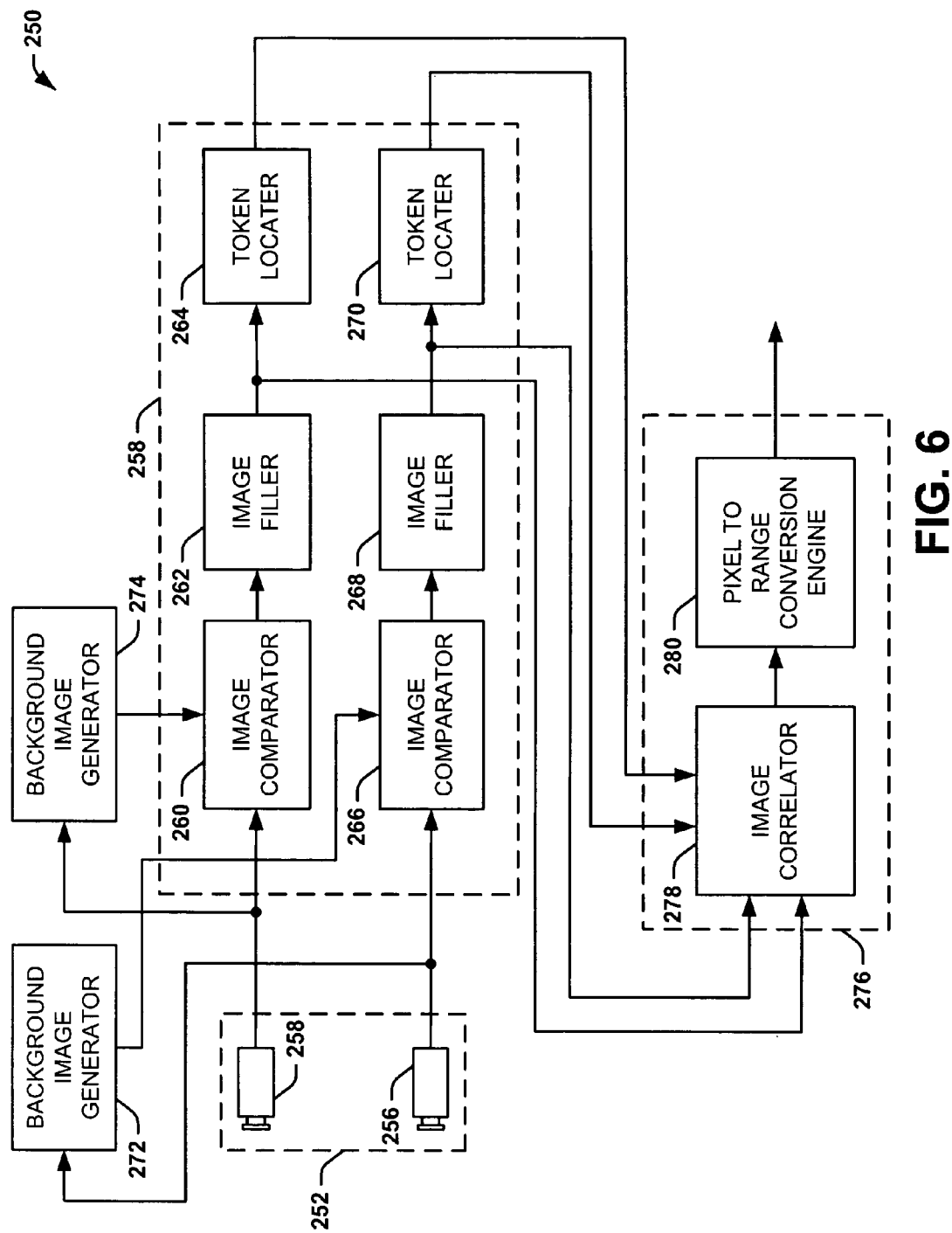
FIG. 6 illustrates another example of a stereo camera intrusion detection system in accordance with an aspect of the invention.

FIG. 6 illustrates another example of a stereo camera intrusion detection system 250 in accordance with an aspect of the invention. The stereo camera intrusion detection system 250 includes a stereo image acquisition stage 252, including a first camera 254 and a second camera 256. The stereo camera intrusion detection system 250 also includes a token detector 258. The token detector 258 includes a first image comparator 260, a first image filler 262, and a first token locator 264. The token detector 258 also includes a second image comparator 266, a second image filler 268, and a second token locator 270. The visual images acquired by the camera 254 are output to the first image comparator 260, and the visual images acquired by the camera 256 are output to the second image comparator 266.

The first image comparator 260 and the second image comparator 266 are each configured to compare the acquired images from the first camera 254 and the second camera 256, respectively, with a background image generated from a first background image generator 272 and a second background image generator 274. Each of the first background image generator 272 and the second background image generator 274 can be substantially similar to the background image generator 50 as described in the example of FIG. 2 above. As such, the background image output from the first background image generator 272 and the background image output from the second background image generator 274 can be substantially vertically and horizontally aligned with the acquired images output from the first camera 254 and the second camera 256, respectively.

Similar to the image comparator 160 in the example of FIG. 4 above, each of the first image comparator 260 and the second image comparator 266 apply an absolute value pixel difference algorithm to generate respective difference images. Likewise, the first image filler 262 and the second image filler 268 each apply a pixel filling algorithm to the respective difference images, such that it can be determined whether a candidate token exists on each of the respective difference images. The filled-in difference images are output from the image filler 262 and the image filler 268 to the respective token locators 264 and 270. In addition, the filled-in difference images are also output from the image filler 262 and the image filler 268 to a location acquisition engine 276. Similar to as described above in the example of FIG. 4, the filled-in difference images can be examined by the respective token locators 264 and 270 to determine the presence of a candidate token on each of the filled-in difference images, and the pixel location of the respective candidate tokens. The token locators 264 and 270 each communicate the two-dimensional pixel location information of the respective candidate tokens to the location acquisition engine 276.

The location acquisition engine 276 includes an image correlator 278 and a dimension conversion engine 280. The image correlator 278 receives the filled-in difference images from the respective first image filler 262 and second image filler 268 as inputs, as well as the two-dimensional pixel location information of the respective candidate tokens from the respective token locators 264 and 270. The image correlator 278 overlays the filled-in difference images at the pixel locations of the respective candidate tokens, as communicated by the respective token locators 264 and 270. The image correlator 278 then applies a pixel shifting algorithm to determine the optimal correlation of the pair of filled-in difference images, similar the image correlator 200 described in the above example of FIG. 5. However, because the token detector 258 detects a separate candidate token for each of the acquired images of the first camera 254 and the second camera 256, and thus generates separate respective difference images, the image correlator 278 can determine correlation between the respective difference images directly. In other words, since the exact pixel location of the candidate token is determined for both of the separate difference images, it is not necessary for the location acquisition engine 276 to apply the SLOG filtering algorithm for correlation. As such, correlation score generation and pixel shifting can occur directly on the filled-in difference image pair.

The number of pixels of offset between the filled-in difference images for optimal correlation is output from the image correlator 278 to the dimension conversion engine 280. The dimension conversion engine 280 examines the pixel offset in the correlation of the filled-in difference image pair and converts the pixel offset into a unit of measure that corresponds to an amount of range that the potential intruder is away from the stereo image acquisition stage 252. The range can then be used to determine a three-dimensional location and size of the potential intruder, similar to as described above in the example of FIG. 4. The three-dimensional location and size data can be output from the dimension conversion engine 280 to a three-dimensional motion calculator and/or a threshold comparator, as described above regarding the example of FIG. 1.

FIG. 7 illustrates another example of a stereo camera intrusion detection system 300 in accordance with an aspect of the invention. The stereo camera intrusion detection system 300 includes a stereo image acquisition stage 302, including a first camera 304 and a second camera 306. The stereo camera intrusion detection system 300 also includes a token detector 308. As described above in the example of FIG. 4, a difference image is generated based on an absolute value pixel difference algorithm. The absolute value pixel differences can be based on texture, brightness, and color contrast, such that the difference image demonstrates substantially all the pixels that are different between each of the acquired images from the given camera and the background image. Therefore, the image comparators described in the examples of FIGS. 4 and 6 above can be sensitive to shadows and changes in brightness, such as by cloudy conditions, thus potentially causing false positive results.

The token detector 308 includes a first image SLOG filter 310, a first filtered image comparator 312, and a first token locater 314. The token detector 308 also includes a second image SLOG filter 316, a second filtered image comparator 318, and a second token locater 320. The visual images acquired by the first camera 304 are output to the first image SLOG filter 310, and the visual images acquired by the second camera 306 are output to the second image SLOG filter 316. The first image SLOG filter 310 and the second image SLOG filter 316 can each generate one or more filtered images of the respective acquired images from the first camera 304 and the second camera 306. For example, each of the first image SLOG filter 310 and the second image SLOG filter 316 can generate a high-resolution filtered image, a medium-resolution filtered image, and a low-resolution filtered image, such as described above in the example of FIG. 3.

A first background image generator 322 generates a background image based on the first camera 304 and outputs the background image to a first background SLOG filter 324. The first background SLOG filter 324 can generate a number of filtered images of the background image equal to the number of filtered images generated by the first image SLOG filter 310. For example, the first background SLOG filter 324 can generate a high-resolution filtered background image, a medium-resolution filtered background image, and a low-resolution filtered background image, with each resolution corresponding to a resolution of the filtered images generated by the first image SLOG filter 310. In a likewise manner, a second background image generator 326 generates a background image based on the second camera 306 and outputs the background image to a second background SLOG filter 328. The second background SLOG filter 328 can generate a number of filtered images of the background image equal to the number of filtered images generated by the second image SLOG filter 316. It is to be understood that each of the first background image generator 322 and the second background image generator 326 can be substantially similar to the background image generator 50 as described in the example of FIG. 2 above.

The first filtered image comparator 312 and the second filtered image comparator 318 are each configured to compare the filtered images generated by the first image SLOG filter 310 and the second image SLOG filter 316, respectively, with the filtered background images generated by the first background SLOG filter 324 and the second background SLOG filter 328, respectively. To obtain a more accurate comparison, it is to be understood that each of the filtered images of each respective resolution can be concurrently compared. Similar to the image comparator 160 in the example of FIG. 4 above, each of the first filtered image comparator 312 and the second filtered image comparator 318 can apply an absolute value pixel difference algorithm to generate respective difference images. However, because the filtered acquired images and the filtered background images demonstrate only binary texture contrasts, the difference images will demonstrate pixels that differ in texture only. As such, the difference images are insensitive to differences in brightness and color contrast between the images acquired by the first camera 304 and the second camera 306 relative to the respective background images. The difference image output from each of the filtered image comparator 312 and the filtered image comparator 318 could be separate difference images for each resolution of the filtered acquired images and respective filtered background images. Alternatively, the difference image output from each of the filtered image comparator 312 and the filtered image comparator 318 could be a single difference image that is based on the comparison of the filtered acquired images and respective filtered background images.

The difference images are output from the filtered image comparator 312 and the filtered image comparator 318 to the respective token locaters 314 and 320. In addition, the difference images are also output from the filtered image comparator 312 and the filtered image comparator 318 to a location acquisition engine 330. Similar to as described above in the example of FIG. 4, the difference images can be examined by the respective token locaters 314 and 320 to determine the presence of a candidate token on each of the difference images, and to determine the pixel location of the respective candidate tokens. In the example of FIG. 7, the pixels demonstrating the binary texture differences between the filtered acquired images and the filtered background images are marked by the respective token locaters 314 and 320 as the candidate tokens. The token locaters 314 and 320 each communicate the two-dimensional pixel location information of the respective candidate tokens to the location acquisition engine 330.

The location acquisition engine 330 includes an image correlator 332 and a dimension conversion engine 334. The image correlator 332 receives the difference images from the respective filtered image comparator 312 and the filtered image comparator 318 as inputs, as well as the two-dimensional pixel location information of the respective candidate tokens from the respective token locaters 314 and 320. The image correlator 332 overlays the difference images at the pixel locations of the respective candidate tokens, as communicated by the respective token locaters 314 and 320. The image correlator 332 then applies a pixel shifting algorithm to determine the optimal correlation of the pair of difference images, similar the image correlator 200 described in the above example of FIG. 5. In addition, similar to as described above in the example of FIG. 6, correlation score generation and pixel shifting can occur directly on the difference image pair, due to the acquired images already having been filtered.

The number of pixels of offset between the difference images for optimal correlation is output from the image correlator 332 to the dimension conversion engine 334. The dimension conversion engine 334 examines the pixel offset in the correlation of the difference image pair and converts the pixel offset into a unit of measure that corresponds to an amount of range that the potential intruder is away from the stereo image acquisition stage 302. The range can then be used to determine a three-dimensional location and size of the potential intruder, similar to as described above in the example of FIG. 4. The three-dimensional location and size data can be output from the dimension conversion engine 334 to a three-dimensional motion calculator and/or a threshold comparator, as described above regarding the example of FIG. 1.

Figure 8:
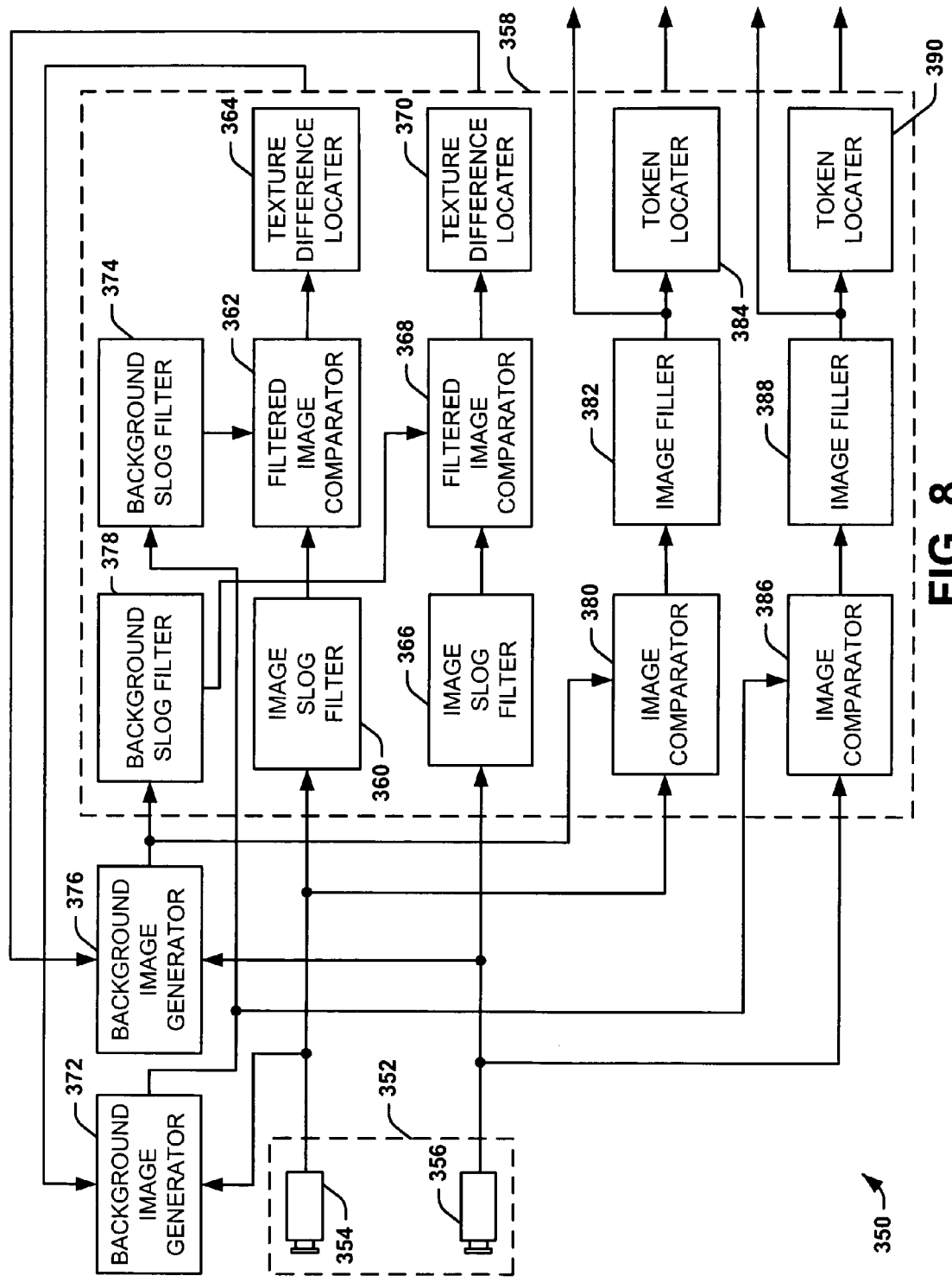
FIG. 8 illustrates another example of a stereo camera intrusion detection system in accordance with an aspect of the invention.

FIG. 8 illustrates another example of a stereo camera intrusion detection system 350 in accordance with an aspect of the invention. The stereo camera intrusion detection system 350 includes a stereo image acquisition stage 352, including a first camera 354 and a second camera 356. The stereo camera intrusion detection system 350 also includes a token detector 358. Similar to the example of FIG. 7 above, the token detector 358 includes a first image SLOG filter 360, a first filtered image comparator 362, and a first texture difference locater 364. The token detector 358 also includes a second image SLOG filter 366, a second filtered image comparator 368, and a second texture difference locater 370.

The visual images acquired by the first camera 354 are output to the first image SLOG filter 360, and the visual images acquired by the second camera 356 are output to the second image SLOG filter 366. The first image SLOG filter 360 and the second image SLOG filter 366 can each generate one or more filtered images of the respective acquired images from the first camera 354 and the second camera 356. For example, each of the first image SLOG filter 360 and the second image SLOG filter 366 can generate a high-resolution filtered image, a medium-resolution filtered image, and a low-resolution filtered image, such as described above in the example of FIG. 3.

A first background image generator 372 generates a background image based on the first camera 354 and outputs the background image to a first background SLOG filter 374. In a likewise manner, a second background image generator 376 generates a background image based on the second camera 356 and outputs the background image to a second background SLOG filter 378. It is to be understood that each of the first background image generator 372 and the second background image generator 376 can be substantially similar to the background image generator 50 as described in the example of FIG. 2 above. However, as is described in greater detail below, the first background image generator 372 and the second background image generator 376 can be configured to rapidly update the background image. Similar to the example of FIG. 7 above, the first background SLOG filter 374 and the second background SLOG filter 378 can each generate a number of filtered images of the background image equal to the number of filtered images generated by the first image SLOG filter 360 and the second image SLOG filter 366, respectively.

The first filtered image comparator 362 and the second filtered image comparator 368 are each configured to compare the filtered images generated by the first image SLOG filter 360 and the second image SLOG filter 366, respectively, with the filtered background images generated by the first background SLOG filter 374 and the second background SLOG filter 378, respectively. Similar to the image comparator 160 in the example of FIG. 4 above, each of the first filtered image comparator 362 and the second filtered image comparator 368 can apply an absolute value pixel difference algorithm to generate respective difference images that demonstrate pixels that differ in texture only. As such, the difference images are insensitive to differences in brightness and color contrast between the images acquired by the first camera 354 and the second camera 356 relative to the respective background images, similar to as described above regarding the example of FIG. 7.

The difference images are output from the filtered image comparator 362 and the filtered image comparator 368 to the respective texture difference locaters 364 and 370. Similar to as described above in the example of FIG. 4, the difference images can be examined by the respective texture difference locaters 364 and 370 to determine the texture differences on each of the difference images, and to determine the pixel location of the respective texture differences. However, because the filtered difference images may be based on and/or include comparisons of filtered images having a low-resolution, the texture differences may appear on the respective filtered difference images as having a lower resolution than the images acquired by the cameras 354 and 356. In other words, a single marked texture difference on a filtered difference image could correspond to several pixels of an image acquired by a respective one of the cameras 354 and 356. As such, in the example of FIG. 8, the first texture token locater 364 communicates the two-dimensional location information of the texture differences to the first background image generator 372, and the second texture difference locater 370 communicates the two-dimensional location information of the texture differences to the second background image generator 376.

The first background image generator 372 can be further configured to receive the two-dimensional location information of the texture differences from the first texture difference locater 364 to rapidly update the first background image. Likewise, the second background image generator 376 can be further configured to receive the two-dimensional location information of the texture differences from the second texture difference locater 370 to rapidly update the second background image. For example, the first background image generator 372 and the second background image generator 376 can each receive the respective two-dimensional locations of the texture differences at a background image updater 56 in the example of FIG. 2.

As described above, a single marked difference on a filtered difference image could correspond to several pixels of an image acquired by a respective one of the cameras 354 and 356. Therefore, it is to be understood that the respective one of the background image generators 372 and 376 can translate the low-resolution two-dimensional location information into an actual pixel location on an image acquired from the respective one of the cameras 354 and 356. As such, the first background image generator 372 can update all pixels of the background image with an image acquired by the first camera 354 except for the pixels corresponding to the two-dimensional location of the texture differences. Likewise, the second background image generator 376 can update all pixels of the background image with an image acquired by the second camera 356 except for the pixels corresponding to the two-dimensional location of the texture differences. It is to be understood that the rapid update of the background images based on the filtered difference images can work in addition to, or instead of, the gradual updates to the acquired background image 54 by the background image updater 56, as described in the example of FIG. 2. In addition, the rapid update can work in addition to a background image stabilizer 58, as described in the example of FIG. 2.

In addition to the components described above, the token detector 358 also includes a first image comparator 380, a first image filler 382, and a first token locater 384. The token detector 358 further includes a second image comparator 386, a second image filler 388, and a second token locator 390. Upon rapidly updating the respective first and second background images, the acquired image from the first camera 354, as well as the first updated background image, is input to the first image comparator 380. Likewise, the acquired image from the second camera 356, as well as the second updated background image, is input to the second image comparator 386.

Similar to the image comparator 160 in the example of FIG. 4 above, each of the first image comparator 380 and the second image comparator 386 apply an absolute value pixel difference algorithm to generate respective difference images. However, it is to be understood that the respective acquired images from the first camera 354 and the second camera 356 can be the same images that were used to rapidly update the background images by the respective first background image generator 372 and the second background image generator 376. As such, all of the pixels of the acquired image are substantially identical to the same pixels in the respective background image, with the exception of the pixels at the two-dimensional location of the texture differences. Therefore, the difference images generated by the respective image comparators 380 and 386 demonstrate the pixels that are different between the acquired images from the cameras 354 and 356 and the respective background images only at the respective two-dimensional locations of the texture differences. Accordingly, the stereo camera intrusion detection system 350 may also be less susceptible to false positive detection of an intruder as the difference images do not demonstrate differences in the locations of small texture differences. In addition, the stereo camera intrusion detection system 350 in the example of FIG. 8 may be a more robust system for detecting intruders based on the redundant generation of difference images.

The first image filler 382 and the second image filler 388 can each apply a pixel filling algorithm to the respective difference images, such that it can be determined whether a candidate token exists on each of the respective difference images. The filled-in difference images are output from the image filler 382 and the image filler 388 to the respective token locators 384 and 390. The filled-in difference images can be examined by the respective token locators 384 and 390 to determine the presence of a candidate token on each of the filled-in difference images. In addition, the filled-in difference images can be output from the image filler 382 and the image filler 388 to a location acquisition engine (not shown), similar to as described above regarding the example of FIG. 6. In addition, the token locators 384 and 390 can each communicate the two-dimensional pixel location information of the respective candidate tokens to a location acquisition engine, as well.

It is to be understood that the stereo camera intrusion detection system 350 is not limited to the example of FIG. 8. For example, one or more of the devices described in the token detector 358 can be integrated together. As another example, the texture difference locaters 364 and 370 could communicate the two-dimensional location information of the texture differences directly to the image comparators 380 and 386, as opposed to rapidly updating the background. As such, the image comparators 380 and 386 could compare the pixel difference only at the texture difference locations communicated by the texture difference locaters 364 and 370.

Figure 9:
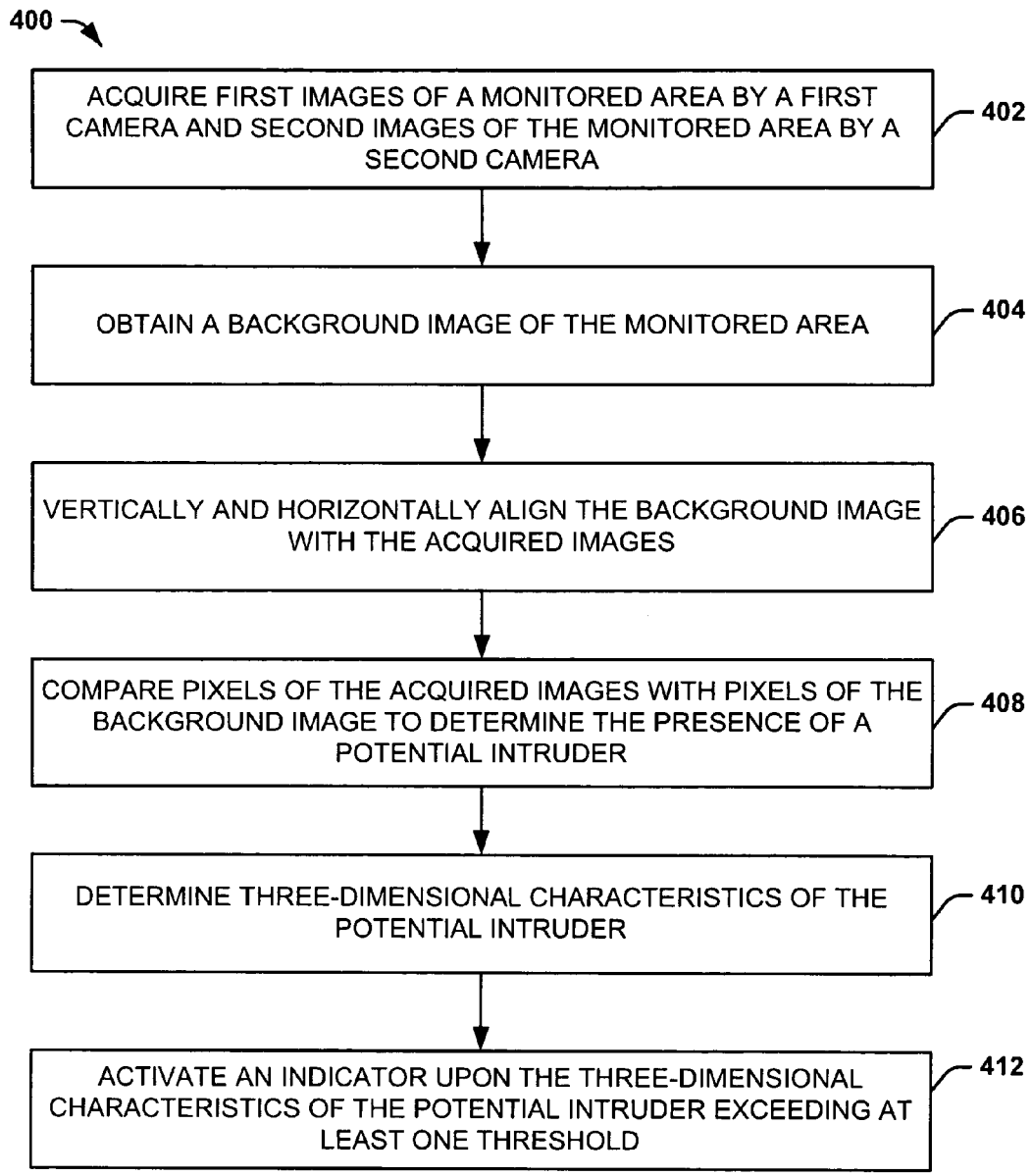
FIG. 9 illustrates a method for detecting intruders in a monitored area in accordance with an aspect of the invention.

In view of the foregoing structural and functional features described above, a methodology in accordance with various aspects of the present invention will be better appreciated with reference to FIG. 9 While, for purposes of simplicity of explanation, the methodologies of FIG. 9 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 9 illustrates an example of a method 400 for detecting intruders in a monitored area in accordance with an aspect of the invention. At 402, first images of the monitored area are acquired by a first camera and second images of the monitored area are acquired by a second camera. The first and the second camera can each be digital cameras, and the first images and second images can each be obtained substantially concurrently, such that the first camera and the second camera operate in stereo with respect to each other. At 404, a background image of the monitored area is obtained. The background image can be based on one or more images obtained by the first camera. A separate background image can be obtained for each of the first camera and the second camera. At 406, the background image is vertically and horizontally aligned with the acquired images. The vertical and horizontal alignment can be obtained by applying a filtering algorithm, such as a SLOG filtering algorithm, to both the background image and the acquired image. The filtered background image and filtered acquired image can then be correlated based on pixel shifting and generating a correlation score for each shift.

At 408, pixels of the acquired images are compared with pixels of the background image to determine the presence of a potential intruder. The acquired images could be both the first acquired images and the second acquired images compared with respective background images. Alternatively, the acquired images can be just the first acquired images compared with a single background image. In addition, the acquired images and the respective background images can be filtered, such that the filtered acquired images are compared with the respective filtered background images.

At 410, three-dimensional characteristics associated with the potential intruder are determined. The determination can be based on correlating filtered versions of the acquired images based on the comparison of the acquired images and the background image. The correlation can be based on generating correlation scores at each shift of a pixel shift algorithm. The correlation can also occur between two separate difference images. The amount of pixel offset between the first images and the second images can be translated to a three-dimensional location and size of the potential intruder.

At 412, an indicator is activated upon the three-dimensional characteristics of the potential intruder exceeding at least one threshold. The threshold could correspond to size and/or location of the potential intruder. In addition, the location of the potential intruder can be tracked across several of the first and second images of the first and second cameras, such that three-dimensional direction of motion and velocity can be determined. Thus, another threshold can be velocity, or motion toward a predefined three-dimensional space.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. An intrusion detection system comprising:
   a first camera configured to generate first images of a monitored area;
   a second camera configured to generate second images of the monitored area;
   a detection device configured to compare the first images with a background image of the monitored area, the detection device marking differences between the first images and the background image as a potential intruder; and
   a tracking device configured to evaluate each of the first images relative to each of the second images to determine three-dimensional characteristics associated with the potential intruder, the tracking device comprising a threshold comparator configured to allow a user of the intrusion detection system to designate at least one three-dimensional space within the monitored area, the at least one three-dimensional space being one of a threshold space and a null zone, the tracking device activating the indicator in response to one of motion into and motion toward the threshold space, and the tracking device not activating the indicator in response to differences between the first images and the background image in the null zone.

2. The system of claim 1, wherein the three-dimensional characteristics comprise location, size, and motion, and further comprising an indicator, such that the tracking device is further configured to activate the indicator upon at least one of the location, the size, and the motion associated with the potential intruder exceeding a respective threshold.

3. The system of claim 1, wherein the first camera and the second camera are each mounted stationary at approximately ground level.

4. The system of claim 1, wherein the background image is a first background image generated from the first camera, and wherein the detection device is further configured to compare the second images with a second background image of the monitored area, the second background image being generated from the second camera, the detection device being further configured to mark differences between the second images and the second background image as the potential intruder.

5. The system of claim 4, wherein the first background image, the second background image, the first images, and the second images are filtered to display texture contrast patterns, such that the detection device is configured to compare the first filtered images with the first filtered background image and to compare the second filtered images with the second filtered background image, the detection device marking differences between the first filtered images and the first filtered background image and differences between the second filtered images and the second filtered background image as the potential intruder.

6. The system of claim 5, wherein the first background image is updated based on the differences between the first filtered images and the first filtered background image and the second background image is updated based on the differences between the second filtered images and the second filtered background image, and wherein the detection device is further configured to mark differences between the first images and the updated first background image as the potential intruder and the second images and the updated second background image as the potential intruder.

7. The system of claim 1, further comprising a background image generator configured to generate the background image of the monitored area, wherein the background image generator comprises a background stabilizer configured to correlate pixels associated with the first images with pixels associated with the background image, such that the pixels associated with the first images are vertically and horizontally aligned with the pixels associated with the background image prior to the detection device marking differences between the pixels associated with the first images and the pixels associated with the background image as the potential intruder.

8. The system of claim 1, wherein the tracking device comprises an image correlator configured to compare each of the first images to a respective one of the second images to determine a location and a size of the potential intruder in three-dimensional space based on a parallax separation of a two-dimensional location of the potential intruder in a given one of the first images relative to a two-dimensional location of the potential intruder in the respective one of the second images.

9. The system of claim 8, wherein the image correlator comprises:
   an image overlay device configured to overlay the given one of the first images on the respective one of the second images, such that the two-dimensional location of the potential intruder on the given one of the first images intersects an approximate location of the two-dimensional location of the potential intruder on the respective one of the second images;
   an iterative pixel shift device configured to repeatedly shift the given one of the first images relative to the respective one of the second images by a single pixel per shift; and
   a correlation calculator configured to determine a correlation score for each shift, such that the parallax separation of the respective two-dimensional locations of the potential intruder is determined based on a given shift that produces a highest correlation score.

10. The system of claim 9, wherein the tracking device comprises a plurality of image filters configured to generate a plurality of first filtered images associated with each of the first images and a plurality of second filtered images associated with each of the second images, each of the plurality of first filtered images having a resolution that is matched to a respective one of the plurality of second filtered images, such that the image overlay device and the iterative pixel shift device are configured to overlay and repeatedly shift a plurality of matched pairs of the plurality of first filtered images and the plurality of second filtered images.

11. A method for detecting intruders in a monitored area, the method comprising:
   acquiring first images of the monitored area from a first camera and second images of the monitored area from a second camera;
   generating a first background image of the monitored area associated with the first camera and a second background image of the monitored area associated with the second camera;
   correlating first pixels associated with the first images with second pixels associated with the first background image of the monitored area, such that the first pixels are horizontally and vertically aligned with the second pixels;
   correlating third pixels associated with the second images with fourth pixels associated with the second background image of the monitored area, such that the third pixels are horizontally and vertically aligned with the fourth pixels;

comparing the first images with the first background image of the monitored area and the second images with the second background image to determine the presence of a potential intruder;

determining three-dimensional characteristics of the potential intruder based on a relative comparison of the first images and the second images; and activating an indicator upon the three-dimensional characteristics of the potential intruder exceeding at least one predetermined threshold.

12. The method of claim 11, wherein determining the three-dimensional characteristics of the potential intruder comprises determining a parallax separation of the potential intruder in each of the first images relative to the respective second images.

13. The method of claim 12, wherein determining the parallax separation comprises overlaying each of the first images onto a respective one of the second images at respective approximate two-dimensional locations of the potential intruder and shifting each of the first images relative to the respective one of the second images until a substantial correlation is found.

14. The method of claim 12, further comprising generating at least one first filtered image associated with each of the first images and at least one second filtered image associated with each of the second images, each of the at least one first filtered image forming a matched pair with a respective one of the at least one second filtered image having a substantially equal resolution.

15. The method of claim 14, wherein determining the three-dimensional characteristics of the potential intruder comprises equally correlating each of the at least one matched pair to determine a parallax separation of the potential intruder.

16. The method of claim 15, wherein the equally correlating comprises:

equally pixel shifting each of at least one first filtered image relative to the respective matched one of the at least one second filtered image;

generating an aggregate correlation score at each pixel shift, the aggregate correlation score comprising a correlation score of each of the at least one matched pair; and comparing the aggregate correlation score at each pixel shift to determine the pixel shift having the highest aggregate correlation score.

17. The method of claim 11, further comprising filtering the first images, the second images, the first background image, and the second background image, wherein comparing the first images and the first background image comprises comparing the first filtered images and the first filtered background image, and wherein comparing the second images and the second background image comprises comparing the second filtered images and the second filtered background image.

18. The method of claim 17, further comprising:

updating the first background image based on the comparison between the first filtered images and the first filtered background image;

updating the second background image based on the comparison between the second filtered images and the second filtered background image;

comparing the first images with the updated first background image to determine the presence of the potential intruder; and comparing the second images with the updated second background image to determine the presence of the potential intruder.

19. The method of claim 11, wherein determining the three-dimensional characteristics comprises determining a location, size, and motion associated with the potential intruder based on differences between the first images and the background image.

20. The method of claim 11, further comprising designating at least one three-dimensional space within the monitored area, such that the at least one three-dimensional space is one of a threshold space associated with activating the indicator and a null zone associated with activating the indicator.

21. An intrusion detection system comprising:

means for simultaneously acquiring first images and second images of a monitored area;

means for continuously generating a background image of the monitored area;

means for generating a plurality of filtered first images corresponding to each of the first images and a plurality of filtered background images, each of the plurality of filtered first images having a different resolution;

means for detecting a potential intruder based on differences between each of the plurality of filtered first images and a corresponding one of the plurality of filtered background images having a same resolution;

means for determining three-dimensional characteristics of the potential intruder based on the first images and the second images; and means for activating an indicator based on the three-dimensional characteristics of the potential intruder.

22. The system of claim 21, wherein the three-dimensional characteristics comprise location, size, and motion.

23. The system of claim 21, wherein the means for determining the three-dimensional characteristics of the potential intruder comprises means for determining a parallax separation of a two-dimensional location of the potential intruder in a given one of the first images relative to a two-dimensional location of the potential intruder in the respective one of the second images.

24. The system of claim 23, wherein the means for determining a parallax separation comprises means for generating a plurality of first filtered images based on the first images and a plurality of second filtered images based on the second images, each of the plurality of first filtered images forming a matched pair with a respective one of the plurality of second filtered images having a substantially equal resolution.

25. The system of claim 24, wherein the means for determining a parallax separation further comprises means for pixel shifting each of the plurality of first filtered images relative to the respective matched one of the plurality of second filtered images and means for generating an aggregate correlation score for each pixel shift based on a correlation score associated with each of the plurality of matched pairs, the parallax separation being associated with the pixel shift having a highest aggregate correlation score.

26. The system of claim 21, further comprising means for horizontally and vertically aligning pixels associated with the plurality of filtered first images and the respective plurality of filtered background images prior to the operation of the means for detecting the potential intruder.

27. The system of claim 1, wherein the detection device is also configured to mark both absolute value pixel differences and filtered texture differences between the first images and the background image as the potential intruder.

28. The system of claim 1, wherein the detection device is also configured to implement a pixel filling algorithm to connect a plurality of pixel differences that are spaced apart by a predefined pixel distance on a difference image associated with one of the first images relative to the background image to generate a potential intruder token corresponding to the potential intruder.

29. The system of claim 1, wherein the detection device is also configured to implement a plurality of filtering algorithms to generate a respective plurality of filtered first images corresponding to each of the first images and a plurality of filtered background images, each of the plurality of filtered first images having a different resolution, the detection device being further configured to compare each of the plurality of filtered first images with a corresponding one of the plurality of filtered background images having a same resolution to mark the differences between the first images and the background image as the potential intruder.

30. The method of claim 11, wherein comparing the first images with the first background image and the second images with the second background image comprises marking both absolute value pixel differences and filtered texture differences between the first images and the first background image and between the second images and the second background image as the potential intruder.

31. The method of claim 11, further comprising implementing a pixel filling algorithm to connect a plurality of pixel differences that are spaced apart by a predefined pixel distance on a first difference image associated with one of the first images relative to the background image and a second difference image associated with one of the second images relative to the background image to generate a potential intruder token corresponding to the potential intruder on the first and second difference images.

32. The system of claim 21, further comprising means for connecting a plurality of pixel differences that are spaced apart by a predefined pixel distance on a first difference image associated with one of the first images relative to the background image and a second difference image associated with one of the second images relative to the background image to generate a potential intruder token corresponding to the potential intruder on the first and second difference images.

* * * * *